United States Patent

[11] 3,623,005

[72] Inventor Richardson S. Roberts, Jr.
Cherry Hill, N.J.
[21] Appl. No. 4,207
[22] Filed Jan. 20, 1970
[45] Patented Nov. 23, 1971
[73] Assignee Ultronic Systems Corp.
Mount Laurel, N.J.
Original application Aug. 1, 1967, Ser. No. 657,664. Divided and this application Jan. 20, 1970, Ser. No. 4,207

[54] VIDEO DISPLAY APPARATUS EMPLOYING A COMBINATION OF RECIRCULATING BUFFERS
5 Claims, 21 Drawing Figs.

[52] U.S. Cl. .......... 340/172.5
[51] Int. Cl. .......... G06f 13/00
[50] Field of Search .......... 340/172.5, 324 A; 178/15, 17.5, 26, 26.5

[56] References Cited

UNITED STATES PATENTS

| | | | |
|---|---|---|---|
| 3,492,422 | 1/1970 | Mason et al. | 178/26 |
| 3,414,889 | 12/1968 | Higgins et al. | 340/172.5 X |
| 3,350,697 | 10/1967 | Hirvela | 340/172.5 |
| 3,413,610 | 11/1968 | Botjer et al. | 340/172.5 |
| 3,422,420 | 1/1969 | Clark | 340/324 |
| 3,478,325 | 11/1969 | Oeters et al. | 340/172.5 |
| 3,497,613 | 2/1970 | Botjer et al. | 340/172.5 X |
| 3,516,069 | 6/1970 | Bray et al. | 340/172.5 |

*Primary Examiner*—Gareth D. Shaw
*Assistant Examiner*—Melvin B. Chapnick
*Attorneys*—Norman J. O'Malley and Theodore C. Jay, Jr.

ABSTRACT: Coded characters from a plurality of input sources are stored in different intervals of a recirculating memory, each interval containing the characters for a row of the display. Characters for a display row are loaded into buffer register means which is then recirculated and the contents encoded during successive recirculations to produce signals representing the portions of the characters to be displayed on respective lines of the display row. Information from one source is displayed in a plurality of rows which are upshifted to rows thereabove and new information displayed in the bottom row, by delaying the vertical sweep relative to said encoding during upshift. Information from another source is displayed in rows which do not upshift, by delaying the decoding so that it remains unchanged with respect to the vertical sweep.

INVENTOR
RICHARDSON S. ROBERTS, JR.

Theodore Jaugh
ATTORNEYS

INVENTOR
RICHARDSON S. ROBERTS, JR.

Theodore Jay Jr.
ATTORNEYS

INVENTOR

RICHARDSON S. ROBERTS, JR.

Theodore Jay I

ATTORNEYS

PATENTED NOV 23 1971 3,623,005

SHEET 04 OF 16

INVENTOR
RICHARDSON S. ROBERTS, JR.

Theodore Jay Jr.
ATTORNEYS

INVENTOR
RICHARDSON S. ROBERTS, JR.

Theodore Jay
ATTORNEYS

INVENTOR
RICHARDSON S. ROBERTS, JR.

Theodore Jay Jr.
ATTORNEYS

INVENTOR
RICHARDSON S. ROBERTS, JR.

ATTORNEYS

INVENTOR
R. RICHARDSON
S. ROBERTS, JR.

Theodore Jay, Jr.
ATTORNEYS

INVENTOR
RICHARDSON S. ROBERTS, JR.

ATTORNEYS

INVENTOR
RICHARDSON S. ROBERTS, JR.

ATTORNEYS

INVENTOR
RICHARDSON S. ROBERTS, JR.

Theodore Jay
ATTORNEYS

INVENTOR
RICHARDSON S. ROBERTS, JR.
Theodore Jay
ATTORNEYS

INVENTOR
RICHARDSON S. ROBERTS, JR.

Theodore Jay Jr.
ATTORNEYS

INVENTOR
RICHARDSON S. ROBERTS, JR.

Theodore Jay[?]
ATTORNEYS

INVENTOR
RICHARDSON E. ROBERTS, JR.

Theodore Jay Jr.
ATTORNEYS

INVENTOR
RICHARDSON S. ROBERTS, JR.

Theodore Jay Jr.
ATTORNEYS

VIDEO DISPLAY APPARATUS EMPLOYING A COMBINATION OF RECIRCULATING BUFFERS

CROSS-REFERENCE TO RELATED APPLICATIONS

This application is a division of copending application, Ser. No. 657,664 filed Aug. 1, 1967.

BACKGROUND OF THE INVENTION

This invention relates to video display apparatus for receiving information in the form of coded characters and displaying it on a television-type display unit. It is particularly useful for the display of stock market quotations and like information, along with news or general market information.

Quotations on stocks, bonds, commodities, etc., are now commonly available by coded ticker tape transmissions from stock exchanges and other commercial sources. Teletype service is also available from commercial sources giving news and other information of interest to stockbrokers, investors, etc. Different types of equipment are used for the display of this information, including paper tape recorders, teletype equipment, quotation boards and television-type display equipment.

The present invention is directed to television-type display equipment and provides means for storing information to be displayed and developing corresponding video signals which yield a highly satisfactory and legible display, and which can accommodate both quotation and news broadcasts with provision for independently changing the displayed information in a manner appropriate to each.

SUMMARY OF THE INVENTION

In accordance with the invention a recirculating memory is supplied with coded characters from one or more input sources. The memory stores the characters in memory row intervals each containing the characters for a row of the display. The characters in different memory row intervals are successively loaded into a row buffer register means which is recirculated between successive loadings thereof to yield outputs during a plurality of cycles corresponding to a plurality of display line sweeps. Advantageously, the row buffer register means comprises a plurality of registers loaded in bit-parallel, character-series form, each register containing like-order bits of the characters. The outputs are supplied to a display character encoder which produces signals line-by-line representing the portions of the characters to be displayed on respective scanning lines of a display row. Advantageously the characters are formed by dots on each scanning line, a predetermined number of dots and lines being allocated to a character and used as required. The output of the encoder is used to form a video signal, and preferably line and field synchronizing signals are incorporated therein to enable conventional television video monitors to be used as display units.

For news broadcasts and the like, a plurality of display rows are employed and the characters entered at the bottom of the display and upshifted to a higher row as a new row is written. This is accomplished by producing a relative delay of the display field sweep with respect to the line-by-line encoding of the characters in the rows to be upshifted, the delay being one scanning line per field for a number of fields equal to the line spacing of the rows in which information is displayed.

The upshift cycle is initiated by a signal indicating that a new row of characters is to be displayed. If characters arrive during the course of an upshift cycle, they are entered in an entry memory row interval occurring after the memory interval that contains characters for the normally lowest display row. They are then read out of the recirculating row buffers and encoded for a normally hidden display row, and upshifted to the normally lowest display row as the characters in that row are upshifted to the row above.

As the upshift cycle is completed, the relative timing of the memory row intervals and the field synchronization is changed so that information in the memory row intervals is loaded into and read out of the row buffers for display rows to which the respective information has been upshifted. Additional new characters are then entered into the memory in the row interval allocated to the normally lowest display row, until the row is completed.

Advantageously the delay between the input and output of the recirculating memory is equal to one-half a display field period, and memory row intervals allocated to information for display rows in the upper half of the display are interleaved with intervals allocated to information for display rows in the lower half. The total number of memory row intervals is an odd integer. Thus the row characters in alternate intervals may be loaded into the buffer registers and the intervals therebetween are available for buffer recirculation, readout and line-by-line encoding.

If desired, the entire display may be devoted to rows which are upshifted as new rows are written. However, the present invention particularly contemplates upshifting only part of the display, without upshifting the other part. This enables information from two or more sources to be displayed at different parts of the display screen, and one part changed independently of the other.

Thus, for example, the upper half of the display may be arranged not to be upshifted, and devoted to stock quotations and the like. These may be written from left to right, and new quotations entered at the left of the same row with erasure of the old. Or, stock indices in tabular form may be displayed as long as desired. The lower half of the display may be devoted to news broadcasts and the like, and upshifted as required to display new rows.

For this operation, coded characters from a plurality of input sources are entered into the recirculating memory in different memory row intervals corresponding to display rows in different parts of the display. For example, teletype news broadcasts may be entered into a memory row interval corresponding to the normally lowest display row, or an entry memory row interval during an upshift cycle, as described above. The display rows in the lower half of the display may be devoted to these broadcasts and will be filled upon successive upshifts. After all rows are filled, information in the uppermost row disappears during the next upshift cycle and is replaced by that in the next lower row, and new information appears in the bottom row. Quotations from the New York and American stock exchanges may be written in the upper half of the display, and replaced as required without regard to the upshifting of the lower half.

To prevent upshifting of the upper half during upshift of the lower, provision is made to delay the row buffer recirculation, readout and encoding of the corresponding row information by amounts equal to the delay of the field sweep during an upshift cycle. Then, after the upshift cycle, the information is relocated in the memory so that it thereafter occurs at the memory output at the proper time with respect to the vertical sweep to be displayed in the same rows as previously.

Stock quotations have letters identifying a stock, followed by figures giving the quotation. It is desired to have the letters displayed in one row and the figures in the next lower row. To accomplish this, the row buffers are recirculated a number of times corresponding to two rows of the display. The characters include letter and figure identification, and are recognized to control the encoding. During the recirculation the encoder first produces line-by-line outputs for the letters and then line-by-line outputs for the figures.

Further features of the invention, and specific means for carrying out the above operations, will be described hereinafter in connection with the specific embodiment.

BRIEF DESCRIPTION OF THE DRAWINGS

FIG. 1*a* illustrates the dot character formation;

DESCRIPTION OF THE PREFERRED EMBODIMENT

Figure 1:
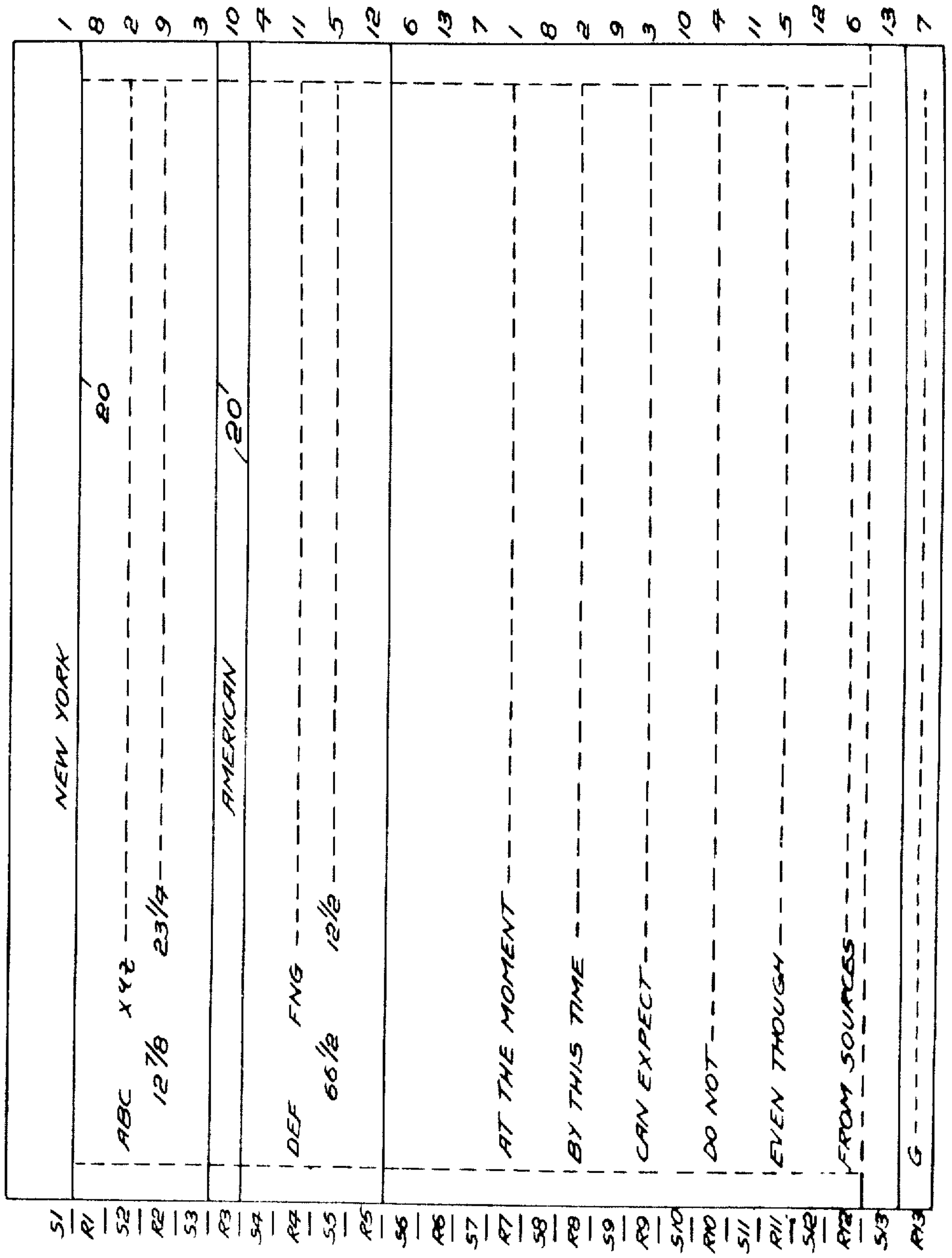
FIG. 1 illustrates a display in accordance with the invention.
Figure 7A:
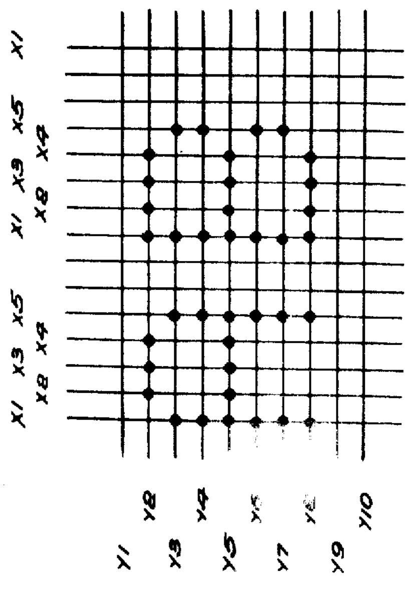
FIGS. 7 and 8 show the timing arrangements, including upshift.

FIG. 1 illustrates the type of display on the face of the television picture tube. The upper half of the display is for stock information, such as quotations obtained from the New York Stock Exchange (NYSE) and American Stock Exchange (AMEX) ticker tapes. The lower half is for news and other information obtained, for example, over a teletype line.

The number of scanning lines, number of rows of display information, and field repetition rate may be selected to meet the requirements of a particular application. In this embodiment a 60 Hz. (Hertz) field frequency with 260 lines per field is employed so that conventional television monitors can be used for display. However, interlacing is not used. The 260 lines are divided into 26 rows of 10 lines each. These numerical values will be used hereinafter for convenience, although it will be understood that they can be changed if desired.

As indicated at the left margin, the 26rows are divided into 13 "S" rows alternating with 13 "R" rows. In the lower half of the picture the "S" rows correspond to memory storage and the "R" rows to readout. In the upper half this is not always true.

At the right margin the order in which information is stored in the recirculating memory is indicated. It will be noted that memory sections 1, 2, 3, etc., are interleaved with memory sections 8, 9, 10, etc., and that the memory cycle occurs twice during a field period. Fixed titles "New York" and "American" are displayed in rows S1 and R3 with dividing lines 20 to separate the titles from the displayed information. Although the title and line information could be stored in the memory, in this embodiment separate title and line generators are employed for the purpose. The NYSE information is displayed in rows S2 and R2, the stock identifying letters appearing in S2 and the quotation figures in R2. Both letters and figures are stored in one memory row, but are displayed in two rows as shown. Similarly, information from AMEX is displayed in rows R4 and S5. The information from each exchange is written from left to right. When the rows are completed, quotations at the left are erased and replaced by new quotations.

The lower half of the screen displays teletype TTY information. Only six rows R7–R12 are actually displayed, R13 being conveniently considered to be out of sight at the bottom of the screen. At the beginning of a TTY message, characters are normally written in row R12. When the row is completed, new information is written in hidden row R13 and upshifted one line per field until it appears in R12. If characters initially arrive during an upshift cycle, they are first written in R13 and upshifted to R12. Inasmuch as the TTY character frequency is slow compared to the field frequency, the upshifting from R13 to R12 is completed during the first few character intervals. Thereafter row R12 is completed. As additional information arrives, it starts again in R13 and is upshifted into R12, the material in R12 being upshifted to R11 at the same time. This operation continues until the top information has been upshifted to R7 and six rows of information are displayed, as shown. Thereafter, as further information appears in R13 and is upshifted into R12, the top row R7 is upshifted and gradually disappears.

Referring to FIG. 1*a*, the display characters are written by a suitable dot pattern. The ten lines of a display row are designated Y1–Y10. Five horizontal dots in vertical columns X1–X5 are available for each character, and characters are separated by two columns at dot frequency. The construction of the letters "A" and "B" by dot patterns is shown. In general, letters are written in seven lines Y2–Y8, as indicated. Fractions, and arbitrary characters if used, may use all ten of the Y lines.

Figure 2:
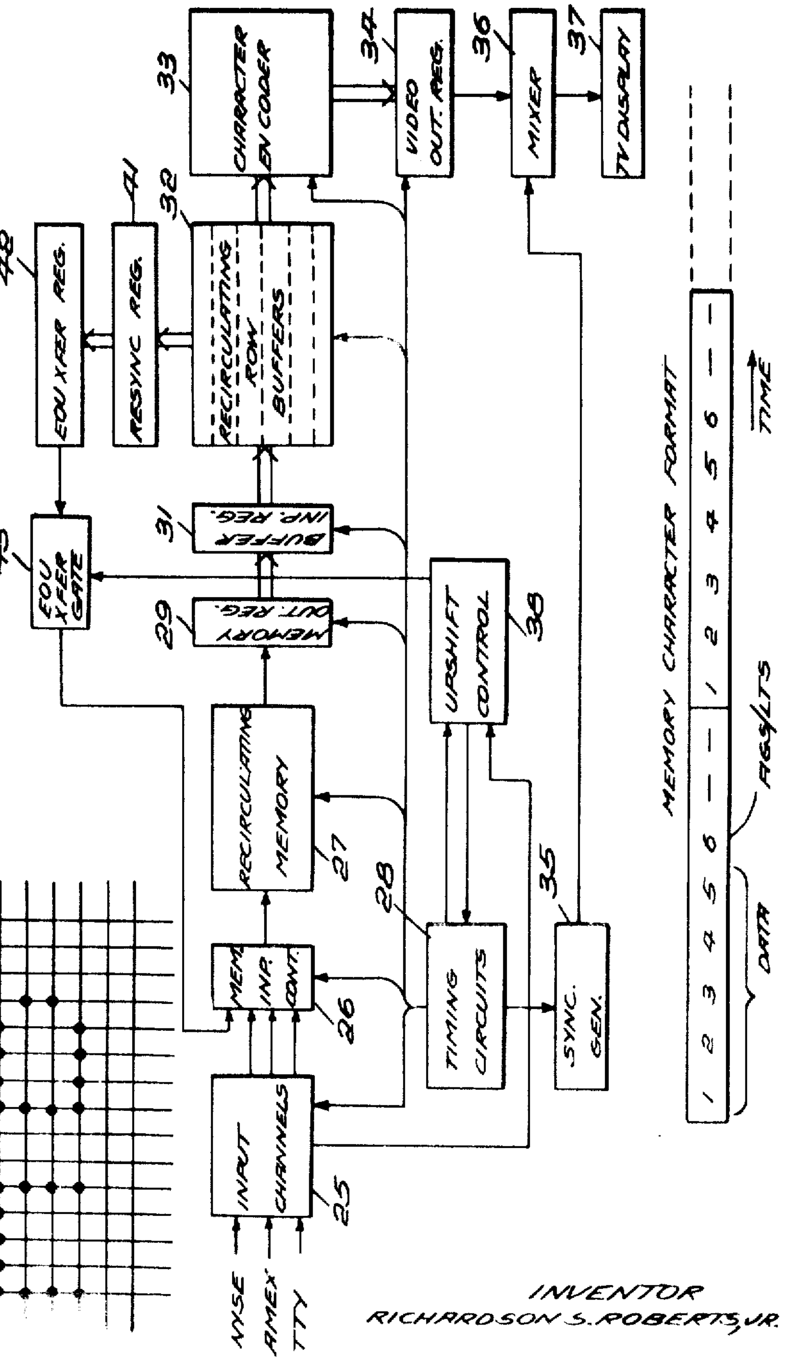
FIG. 2 is a simplified overall block diagram of the apparatus.

Referring to FIG. 2, a simplified block diagram shows the overall arrangement of the apparatus. Input channels 25 receive ticker information from NYSE and AMEX, together with TTY information. The information is then transferred by memory input control 26 to a recirculating memory 27. The period of the memory recirculation cycle is selected as one-half the TV field period, specifically 8 (⅓) milliseconds for a 60 Hz. field frequency. The memory stores characters in serial digital bit form, and the input information is fed into the proper memory character cells under the control of timing signals from timing circuits 28.

Information in memory 27 is supplied serially to memory output register 29. As each character is registered in 29, the bits thereof are transferred in parallel to a buffer input register 31. Then, the character bits are transferred in parallel to a plurality of recirculating row buffers 32. In this embodiment six-bit characters are employed in the memory, and six row buffers are employed. Each row buffer accommodates one coding bit of each character of a display row. Here, 48 characters per display row are used for stock information and 50 characters for TTY information.

The outputs of the row buffers 32 are supplied in parallel to a character encoder 33. Inasmuch as 10 lines are allocated to a display row, the row buffers 32 recirculate 10 times per display row so that the character encoder 33 can form the row dot patterns line by line for display purposes. Since NYSE and AMEX quotations occupy two rows, the buffers recirculate 20 times. For a given line, as each character is encoded the corresponding line dot pattern is transferred in parallel to the video output register 34.

All the registers and buffers, etc. are supplied with suitable timing signals from 28, as indicated. Timing signals are also supplied to sync generator 35 which produces conventional vertical and horizontal sync signals in accordance with present television standards. The synchronizing signals and the video signals are supplied to mixer 36 to form a composite TV signal which is fed to TV display 37.

The upshift cycle is initiated by a line feed character from the TTY input channel to upshift control 38. During this cycle the display rows in the lower half of the display are upshifted, but the display rows within the upper half are not. Broadly, the upshifting of the lower half of the display is produced by delaying the vertical sync pattern relative to memory readout one line at a time for successive fields until a total upshifting of 20 lines has been produced. During this upshift the utilization of information from the row buffers 32 by the character encoder 33 for the upper half of the display is delayed by one H (horizontal line period) per frame so that the upper half does not upshift. At the end of the upshift, the relative timing of memory readout and vertical synchronization is changed to reestablish the normal relationship between memory rows and display rows, and information in the memory for the upper half of the display is relocated. The relocation involves resync register 41, EOU (End of Upshift) transfer register 42 and gate 43, as will be described later.

The memory character format is shown at the bottom of FIG. 2. The sixth bit indicates whether the preceding five data bits are for figures or letters. A two-bit space occurs between successive memory characters.

The logic diagrams shown in subsequent figures use digital logic elements. Many types of elements are known in the art and may be used as desired to perform the functions hereinafter described. The specific embodiment here shown uses NOR logic units extensively, examples of which are given in U.S. Pat. No. 3,281,788, FIGS. 6–8. Their functioning will be described at this time to facilitate understanding the diagrams.

Figure 3:
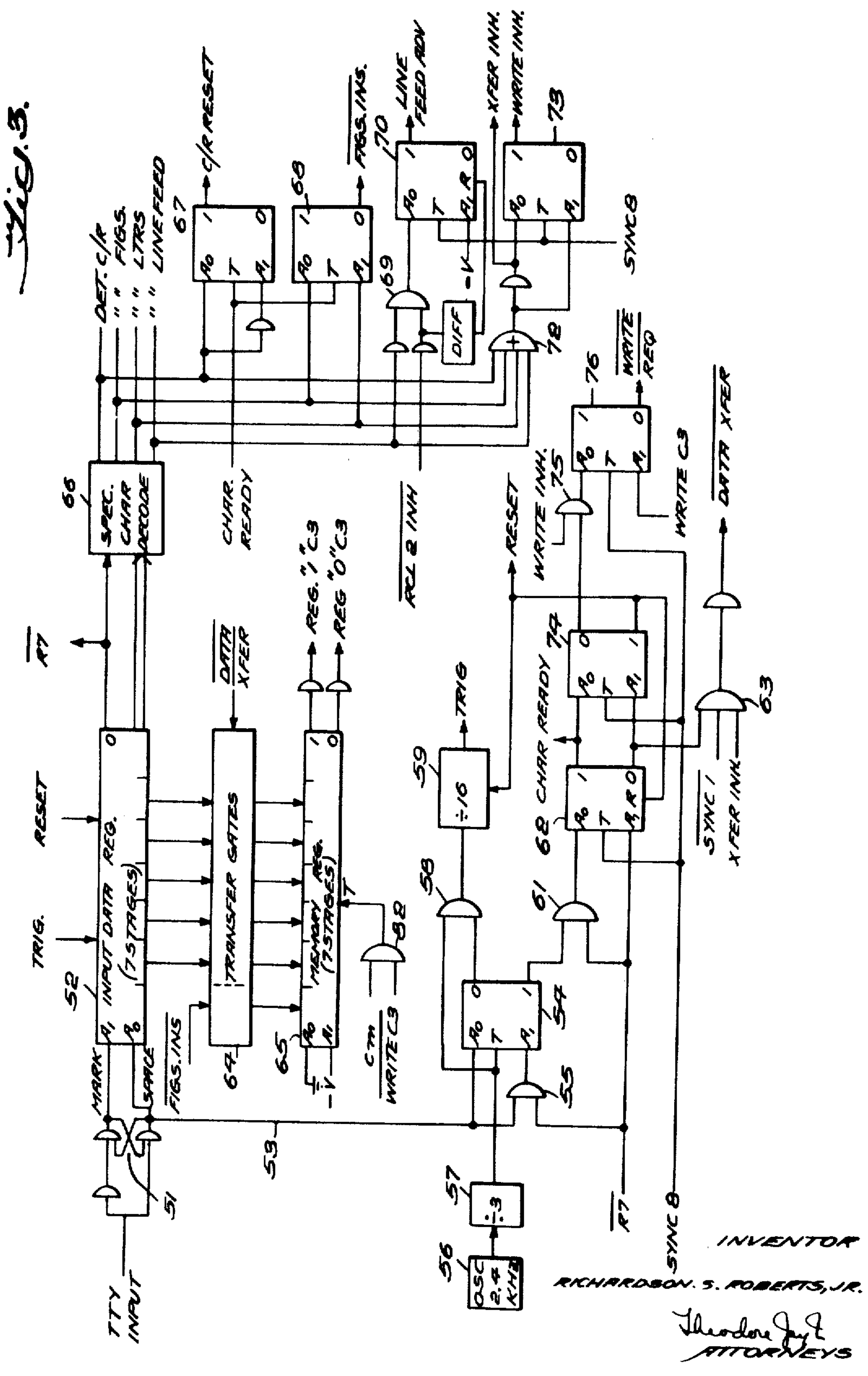
FIGS. 3, 3*a* and 4 show the input channels in detail.

A gate such as shown at 55 in FIG. 3 has a plurality of inputs and one output. If any input line is high (say ground potential), the output line is low (say negative). If all input lines are low, the output line will be high. Thus, the gate functions as an AND gate with polarity inversion for input signals whose assertion levels are low, and as an OR circuit with inversion for signals whose assertion levels are high. An OR use is indicated by +, as at 72. If only one input line is used and the others left unconnected, the gate functions as a polarity inverter.

Two such gates may be cross-connected as shown at 51 to form a DC flip-flop. A high input signal to either side (with the input to the other side low) will cause the output of that side to go low and the output of the other side to go high. The terms "set" and "reset" will be used hereinafter to designate the two possible states of the flip-flop, and are selected arbitrarily as seems convenient.

An AC flip-flop such as shown at 62 in FIG. 3 is a bistable multivibrator having steering inputs A0 and A1, and outputs 1 and 0. The FF is triggered by a positive-going signal to the T input and reset by a high signal to the R input. In the reset state the "0" output is high and the "1" output low. In the set state the outputs are reversed. If the steering inputs are high to A0 and low to A1, a trigger signal will set the flip-flop. If the steering inputs are low to A0 and high to A1, a trigger signal will reset the flip-flop. A shift register such as shown at 52 may be constructed of a number of AC flip-flops interconnected in known manner. Counters may also be made of AC flip-flops in known manner.

Both barred and unbarred signals are shown in the drawings, and are the inverse of each other. Usually the assertion level of an unbarred signal is high, and that of a barred signal is low. One signal may be obtained from the other by passing it through an inverter, or both outputs of a flip-flop may be used to provide the two signals, etc.

Certain portions of the apparatus such as the row buffers 32, character encoder 33 and video output register 34 operate at high speed. In such case integrated circuit logic elements are employed in practice. Several types are available commercially and vary somewhat in the polarity of signals required to produce a desired result, and in other operating details. To avoid confusion herein, the description is in terms of NOR logic as described above. The changes required for other types of logic elements will be understood by those skilled in the art.

Many signals used in earlier figures are developed in later figures. Usually their functioning will be described as they are used, leaving detailed development until later.

Referring now to FIG. 3, this shows a portion of the input channel for TTY signals, sometimes designated C3 (for Channel 3). The TTY signals are assumed to be of conventional five-level type having five data bits preceded by a start space and followed by a stop mark for each character.

The line TTY signals are supplied through DC FF51 to input register 52. The register has seven AC FF stages of the type described above, shifted by TRIG pulses. Marks and one-bits are assumed high at the $A_1$ input and low at the $A_0$ input. Spaces and zero-bits are high at the $A_0$ input and low at the $A_1$ input.

A TTY line normally marks between characters, resetting the stages of register 52 and yielding a high $\overline{R7}$ from the last stage. When a start space arrives, line 53 will go high. This makes the $A_0$ input of FF54 high, and the high $\overline{R7}$ to gate 55 is inverted to make the $A_1$ input low, thus steering FF54 toward set. A 2.4 kHz. oscillator 56 drives a 3 counter 57 to supply 800 Hz. pulses to the T input of FF54 and to gate 58. One pulse sets FF54, making its zero-output low and enabling gate 58. Subsequent pulses pass through gate 58 to a 16 counter 59, thereby yielding 50 Hz. TRIG pulses corresponding to a 50 Baud rate for the TTY signals. Counter 59 is arranged to give a TRIG pulse at each count of 8, so that the TRIG pulses occur in the middle of bit intervals. These shift register 52. The high $\overline{R7}$ to gate 55 maintains the $A_1$ input low during the shifting so that FF54 cannot be reset.

When a TTY character has been fully shifted into register 52, the start space in the last stage will make $\overline{R7}$ low. The stop mark will make line 53 low. This reverses the steering of FF54 and it will be reset by the next pulse to its T input, closing gate 50 and stopping the shifting of register 52. Gate 61 senses when the shift clock is cut off. The resetting of FF54 and the low $\overline{R7}$ makes both inputs low, and the gate output will be high. This steers FF62 toward set.

Sync 8 pulses are produced at the beginning of each memory character cycle (FIG. 14*b*) and will set FF62. The resulting low zero-output enables gate 63 to pass the next sync 1 pulse (FIG. 14*c*), assuming XFER INH is low. The high gate output is inverted to produce a low $\overline{\text{DATA XFER}}$ which opens transfer gates 64 to transfer the five data bits in register 52 to memory register 65 in parallel. The latter has set steering inputs by making $A_0$ of the first stage high and $A_1$ low, as indicated, so that a previous shift out will leave all stages set. Thus the transferred data bits need only reset the appropriate stages.

Before proceeding further with the memory transfer operation, the special character decoding will be described. TTY signals include special characters for carriage return, indicating the end of a line; for figures and letters, indicating the nature of subsequent characters until changed; and for line feed, indicating the start of a new line. The states of the five data stages in register 52 are supplied to the special character decoder 66, along with $\overline{R7}$ to indicate when the character is ready for decoding, and yields one or another of the outputs indicated. If carriage return is denoted, FF67 is steered toward set. A high CHAR. READY signal is produced by the setting of FF62 and sets FF67 to produce a high C/R RESET signal used in FIG. 3*a*.

A figures character steers FF68 toward set, and the CHAR. READY signal sets it to produce a low $\overline{\text{FIGS. INS.}}$ signal. A letters character produces the opposite steering and FF68 is reset. Either character is remembered until the opposite character is received.

A line feed character produces a high signal which is inverted to be a low signal to gate 69. $\overline{\text{RCL2 INH.}}$ (FIG. 18*i* inverted) is high except during upshift, and is inverted to be low to gate 69. Thus, the gate output to $A_0$ of FF70 is high. The $A_1$ input is held low by −V. FF70 is set by the next SYNC 8 pulse to produce a high LINE FEED ADV. signal which initiates upshift. If a second line feed is received while upshift is proceeding, $\overline{\text{RCL2 INH.}}$ causes it to be ignored. The inversion of this signal goes high at the beginning of upshift, and is differentiated and used to reset FF70.

The special TTY characters are not inserted in the memory. Accordingly all lines from 66 are connected to OR72 to produce a low output when any line is high. This is inverted to give a high XFER INH which inhibits gate 63, thereby making $\overline{\text{DATA XFER}}$ high to prevent the transfer from register 52 to 65. FF73 is steered to be set by the next SYNC 8 pulse, thereby giving a high write inhibit signal.

Returning to the memory transfer operation, the output of FF68 is supplied to the sixth transfer gate in 64 and thus introduces the proper sixth-bit in the memory register 65 at the time of data transfer. Shiftout of the register is timed with the memory cycle by $\overline{\text{WRITE C3}}$, and this will now be described.

When FF62 is set to transfer data to the memory register, it steers FF74 toward set and the next SYNC 8 pulse sets FF74. The resultant high one-output resets FF62, counter 59, and input register 52, making them ready for a subsequent TTY character. The low zero-output is inverted by gate 75 to make the $A_0$ input of FF76 high, provided WRITE INH is low to indicate the absence of a special character. WRITE C3 (FIG. 3*a*) to the $A_1$ input is low at this time, and FF76 is set by the next SYNC 8 pulse to make the write request zero-output low. This indicates that the character in register 65 is ready for insertion in the memory at the proper time. FF74 is reset due to the reversed steering from the reset FF62.

Figure 3A:
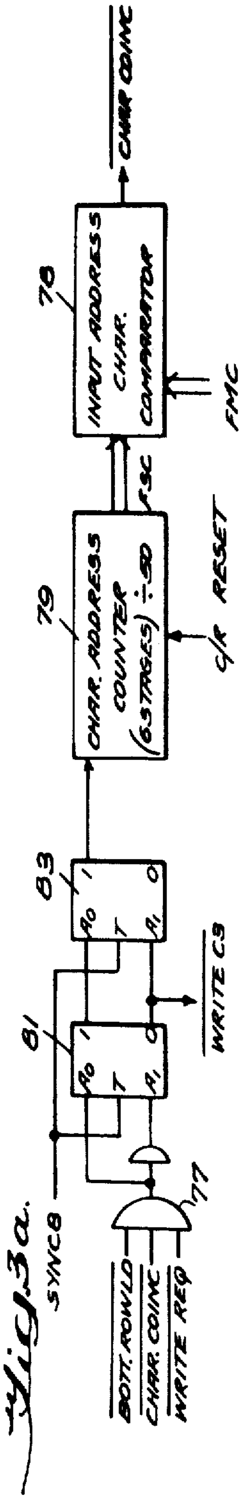
Figure 7:
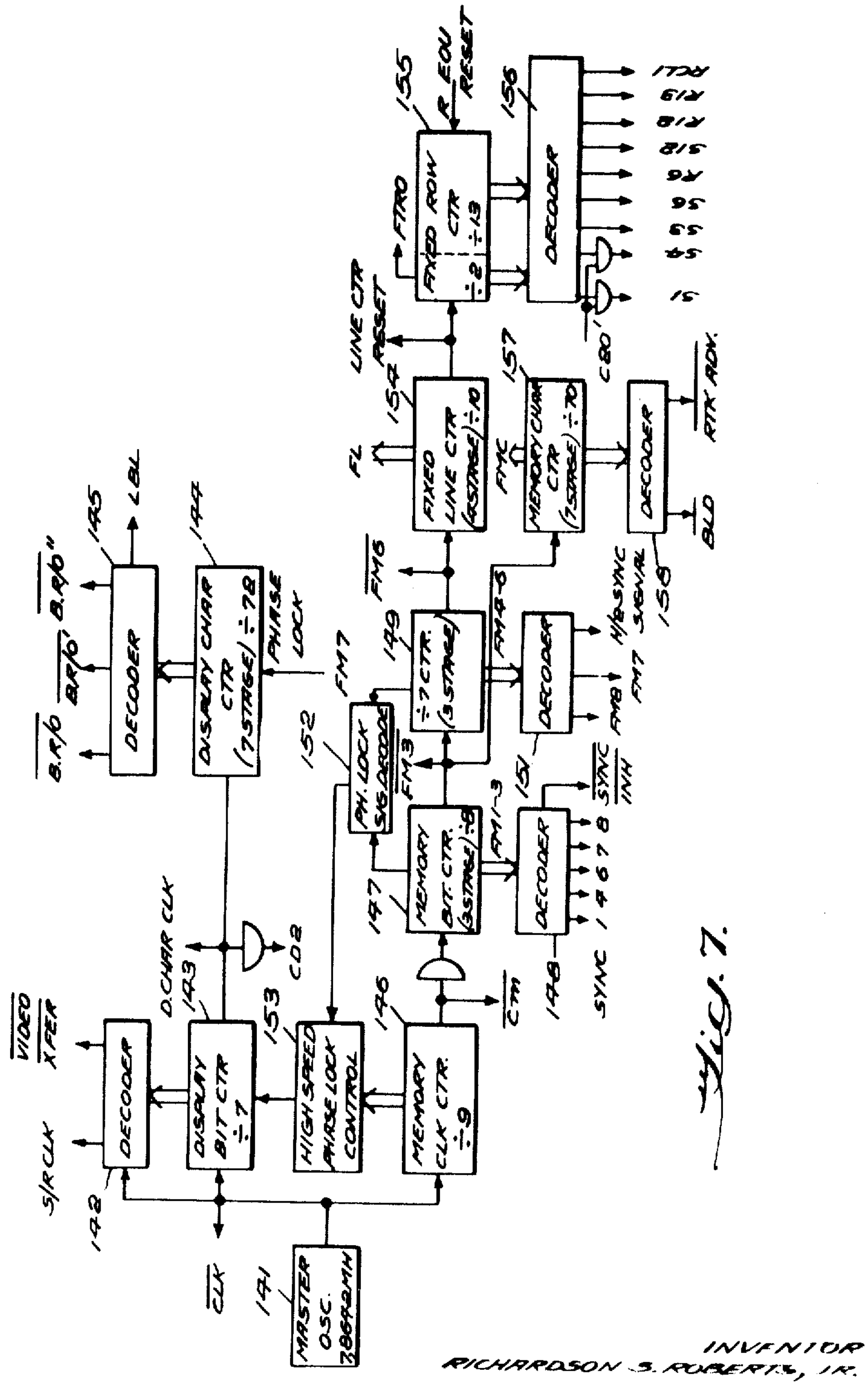

Referring to FIG. 3*a*, the $\overline{\text{WRITE REQ.}}$ signal is supplied to gate 77. $\overline{\text{BOTT. ROW LD}}$ (FIG. 17*s*) is low when the proper memory row occurs, as will be described. $\overline{\text{CHAR. COINC}}$ goes low when the proper character slot is present at the memory input. This signal is produced by comparator 78. Character address counter 79 counts the characters as they are supplied from register 65 to the memory. The states of the stages in counter 79, designated FSC, are supplied to comparator 78. Inputs FMC to the comparator are obtained from a memory character counter (FIG. 7). When the counts coincide, a low $\overline{\text{CHAR. COINC}}$ signal is produced. This actuates gate 77 to steer FF81 toward set, and the next SYNC 8 pulse sets it to make $\overline{\text{WRITE C3}}$ low. The latter signal enables gate 82 (FIG. 3) to pass Cm (memory clock) shift pulses to register 65 and deliver the TTY character bits to the memory. $\overline{\text{CHAR. COINC}}$ goes high after one character interval, thereby causing FF81 to be reset by the next SYNC 8 pulse.

The setting of FF81 causes FF83 to be set by the next SYNC 8 pulse, and the output advances counter 79 to the next character count. A high C/R RESET from FF67 (FIG. 3) resets counter 79, ready to start counting characters of another row of information.

When FF81 is set, WRITE C3 to FF76 (FIG. 3) goes high. FF74 will have been reset by a SYNC 8 pulse following aof FF62, thus yielding a high zero-output which, by inversion, is low at $A_0$of FF76. Consequently FF76 is reset by the next SYNC 8 pulse to discontinue the write request.

Figure 14:
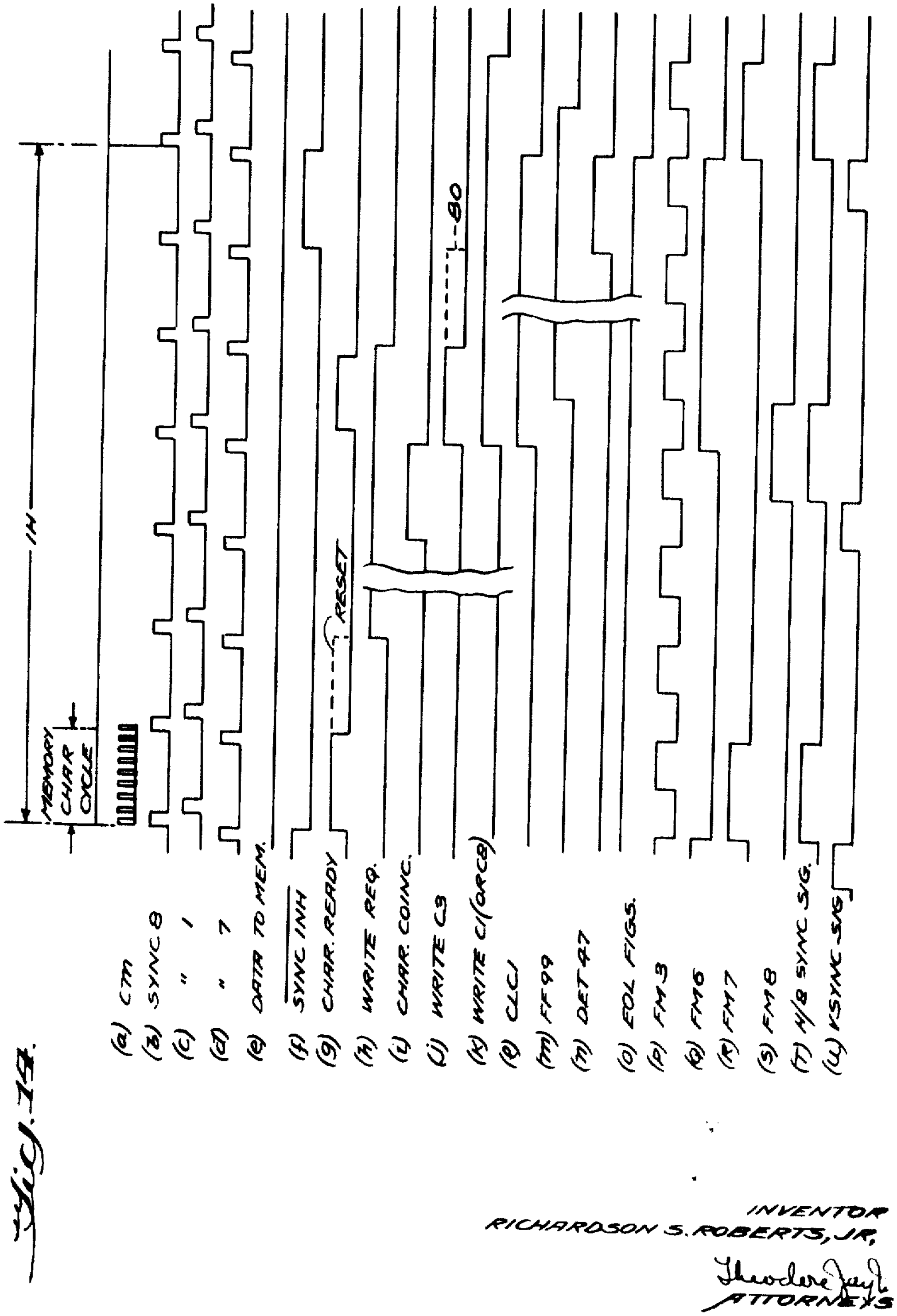
FIGS. 13–19 illustrate waveforms used in preceding FIGURES.

The timing waveforms of FIG. 14 illustrate certain of the input operations described. Cm, Sync 8 and Sync 1 pulses are shown at *a–c*. CHAR. READY from FF62 is shown at *g* and the subsequent WRITE REQ. from FF76 at *h*. Upon CHAR. COINC at *i*, WRITE C3 is produced at *j*. Data from register 65 to the memory is shown at *e*, in the six-bit interval following sync 8. Cm shift pulses are shown at *a*. After writing, FF83 is set to advance the address counter as shown at 80.

The input channels C1 and C2 for NYSE and AMEX are generally similar to that for C3, and only the differences need be described. Since the ticker line signals have six data bits, register 52 is increased by one stage. The special character decoder 66 and associated circuits are eliminated, and the sixth bit in register 52 denoting a letter or figure character is supplied to gates 64 instead of $\overline{\text{FIGS. INS}}$. The oscillator 56 and divider 57 are changed to 64.8 kHz. and 32 kHz., respectively, each divided by 30, to correspond to the two presently employed ticker data rates. The XFER INH to gate 63 and WRITE INH. to gate 75 are eliminated.

Figure 4:
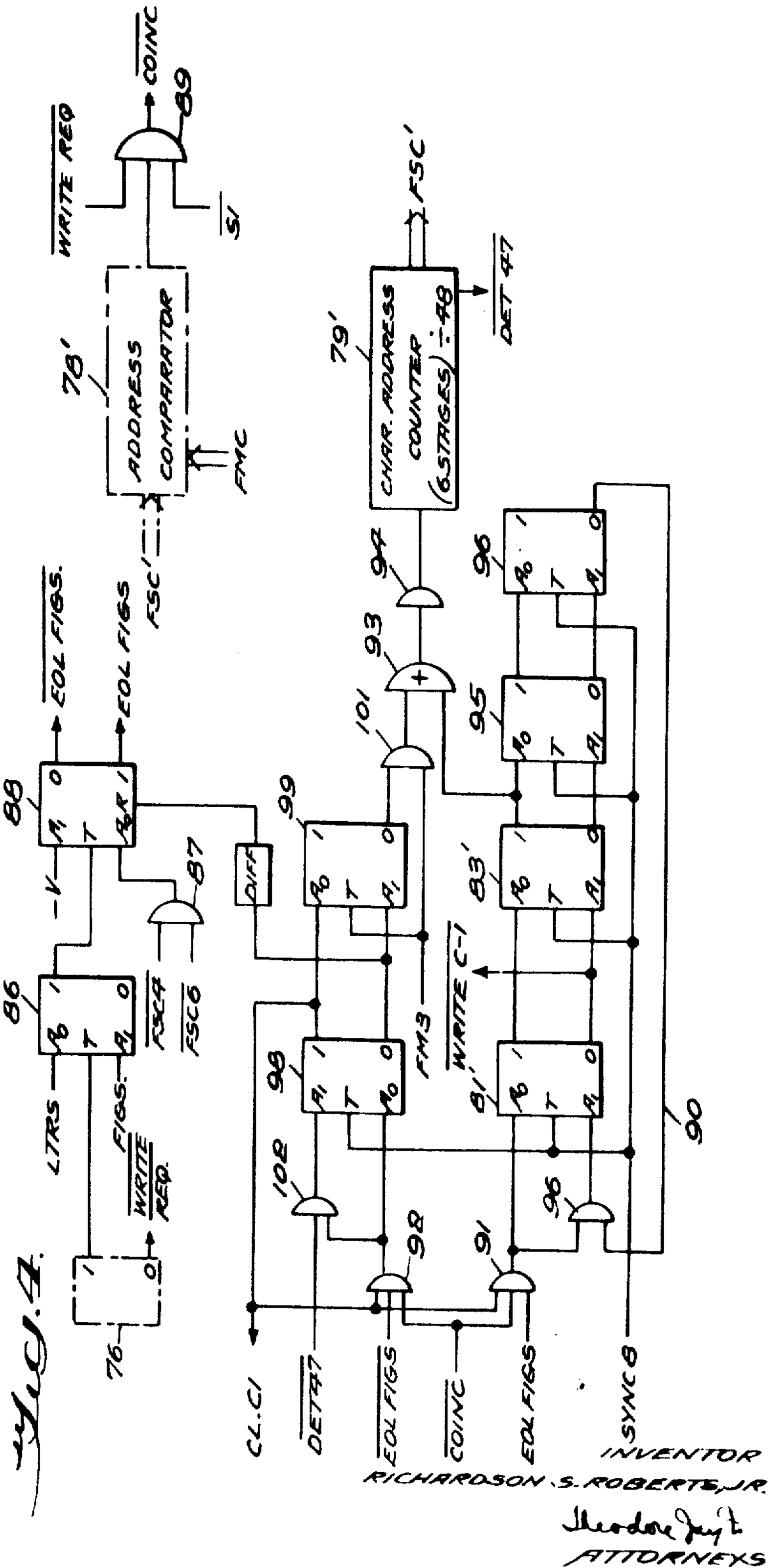

Other changes are shown in FIG. 4. These circuits prevent starting a new quotation in the last eight character positions of a display row since it might be incomplete, and to erase old quotations three characters in advance of new quotations.

Referring to FIG. 4, FF76 of FIG. 3 is shown dotted, and its one-output used to trigger FF86. The sixth bit in the memory register indicating letters or figures is used to provide steering inputs to set FF86 on transitions from figures to letters, and reset it for opposite transitions. Gate 87 has FSC′ inputs from address counter 79′ which are low for counts 40–47 corresponding to the last eight of the 48 characters in a display row. Thus FF88 is steered toward set under these conditions, and a transition from figures to letters causes the one-output of FF86 to go high to set FF88, thereby making EOL (End Of Line) FIGS. high and $\overline{\text{EOL FIGS}}$. low. These are applied to gates 91, 92.

$\overline{\text{COINC}}$ is developed by comparing the FSC′ outputs of counter 79′ with FMC signals in comparator 78′ as in FIG. 3*a*. $\overline{\text{WRITE REQ}}$ to gate 89 allows its development only after a character is in the memory register. $\overline{\text{S1}}$ from a row counter (FIGS. 7, 17*g*) selects the proper row in the memory for channel one data. In channel four for AMEX data, this would be $\overline{\text{S4}}$.

$\overline{\text{COINC}}$ is supplied to gates 91, 92 and normally FF81′ is set by SYNC 8 to make $\overline{\text{WRITE C1}}$ low (like FF81 for C3) and the character is supplied to the memory. FF83′ is then set to advance counter 79′ through OR93 and inverter 94. $\overline{\text{COINC}}$ then goes high, but FF81′ remains set since high line 90 to gate 96 maintains the $A_1$ input low. FF95, 96 are set successively at SYNC 8 intervals and line 90 goes low to allow the resetting of FF81′ and discontinue writing. This operation maintains $\overline{\text{WRITE}}$ C1 low for three character intervals after the character in memory register 65 has been delivered to the memory. Since the register is steered toward set, the data in the memory is cleared for three character intervals following the new character.

Figure 5:
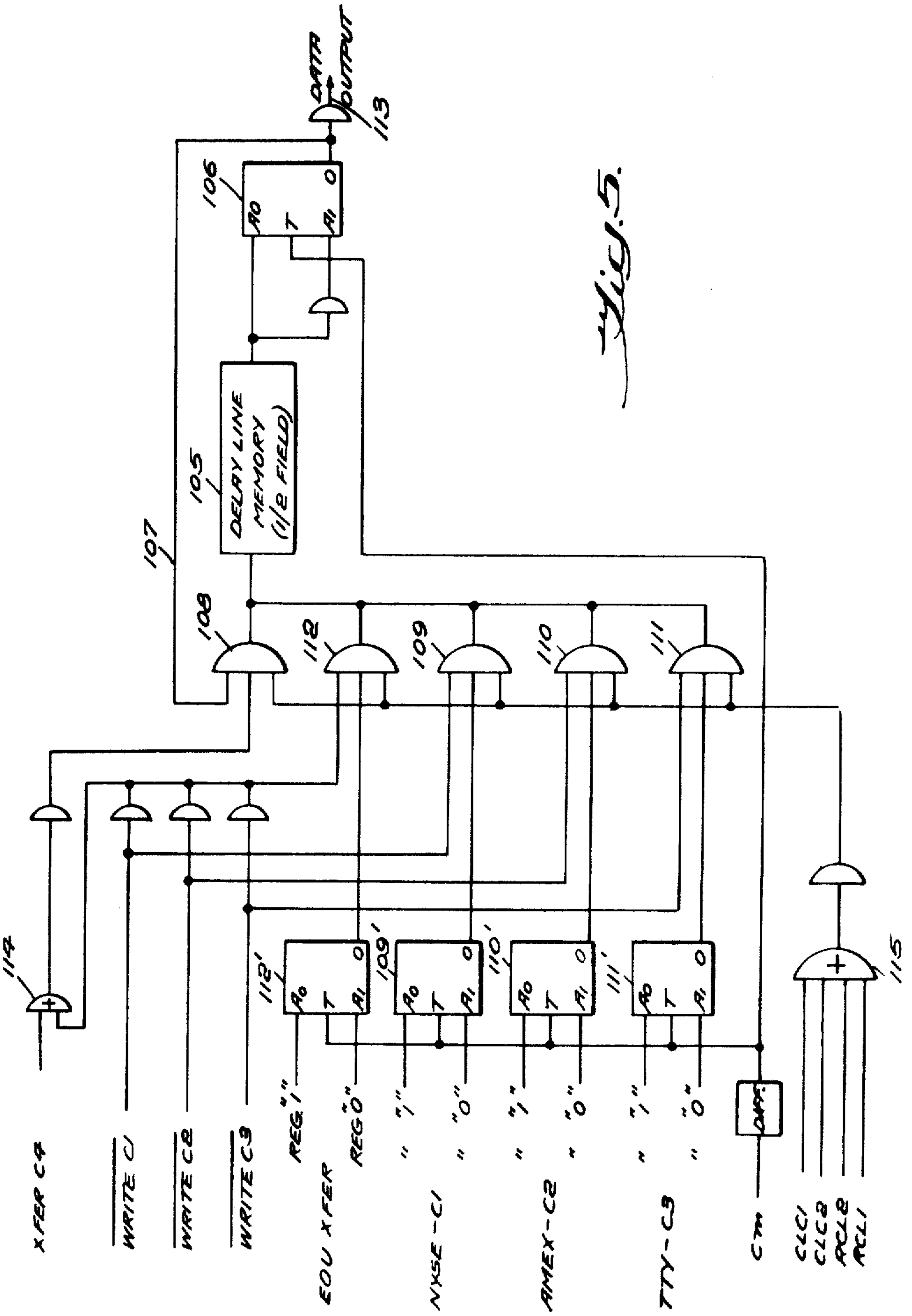
FIGS. 5 and 6 show the recirculating memory and control, and the recirculating buffers and control.

If a new quotation starts in the last eight character positions of a display row, EOL FIGS. to gate 91 will inhibit the write operation just described. Gate 92 will be enabled and FF98 set. This makes CLC1 (Clear C1) high to inhibit gates 92, 91, and also clear the remaining characters in the memory row (FIG. 5). FF99 is steered toward set and FM3 pulses (FIG. 14*p*) from the memory character bit counter (FIG. 7) sets FF99 to enable gate 101 to pass FM3 pulses and step counter 79′ at successive character intervals. The last count 47 is detected and $\overline{\text{DET 47}}$ goes low to gate 102, allowing FF98 to be reset by SYNC 8. The resultant high zero-output is differentiated and resets FF88.

The internal resetting of counter 79′ to a zero-count then permits the character in memory register 65 to be supplied to the memory by the operation of the normal channel including gate 91, FF81′, etc.

FIG. 14*k* shows WRITE C1 lasting for four memory character cycles to write the character as shown at *e* and clear the memory three characters after the writing. For the last eight character positions in a row, instead of WRITE C1 the CLC1 is developed as shown at *l* and remains high to the end of the row. The setting of FF99 is shown at *m*, and upon occurrence of DET 47 at *n*, EOL FIGS. goes low as shown at *o*.

Referring to FIG. 5, a delay line memory 105 has a delay of ½-field (8 (⅓) ms.), and is advantageously a magnetostrictive delay line. Recirculation is through FF106 and line 107 under the control of gate 108. Gates 109–111 control the supply of new data from channels C1–C3 respectively, and gate 112 is for transfer after upshift. FF's 109′–111′ receive the Reg. "1" and "0" outputs of the memory registers 65 in respective channels, and are triggered by differentiated Cm pulses at memory bit frequency. The same pulses trigger output FF106 to deliver data from the memory to output line 113. Gates 109–111 are enabled by $\overline{\text{WRITE}}$ signals of respective channels, so that only one is enabled at a time.

Information to be transferred in the memory at the end of upshift (EOU) is supplied to FF112′. The high transfer signal XFER C4 to OR114 is inverted and inhibits gate 108 to open the recirculation path during transfer. The $\overline{\text{WRITE}}$ signals are inverted and supplied to OR114 to open the recirculation path when new data is being written, so as to substitute new data for the old. They are also applied to gate 112 to block the gate when new data is ready during transfer at the end of upshift.

CLC1 signals for channel 1 (FIG. 4) and corresponding CLC2 signals for channel 2 are supplied to OR115 and inverted to inhibit gates 108–112 and clear memory character positions for the ends of respective display rows. Certain memory rows (S2, S5, S6) are not required to be used in this embodiment, and RCL1 clearing signals are developed for these rows. Other memory rows are used only during upshift (S3, S13), and RCL2 signals (FIG. 17*r*) normally clear them.

Figure 6:
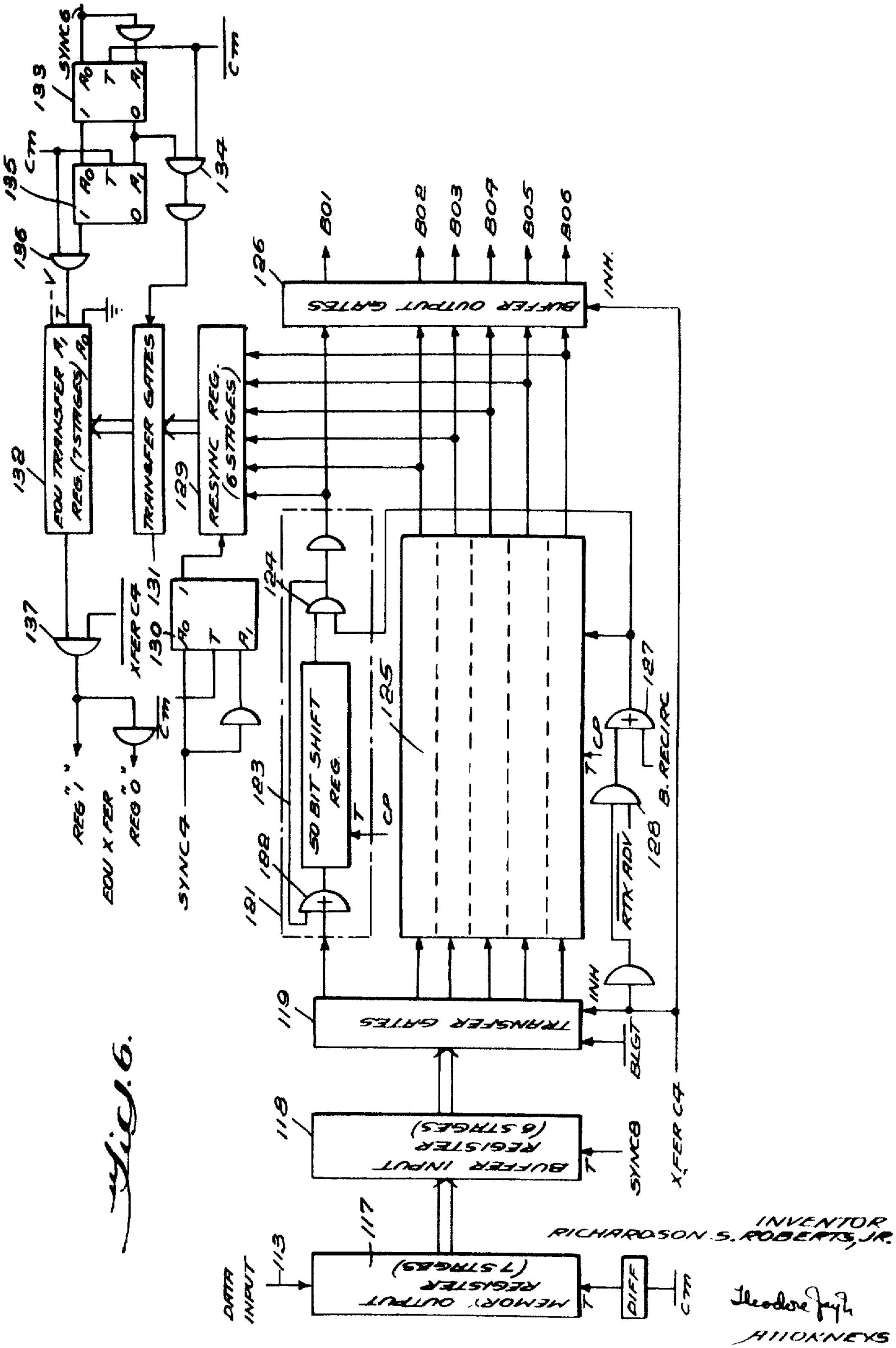

Referring to FIG. 6, memory characters are shifted serially into memory output register 117 by differentiated $\overline{C_m}$ pulses and transferred in parallel at SYNC 8 time to buffer input register 118. The six bits of each character are then transferred to six recirculating buffer shift registers by gates 119 controlled by $\overline{\text{BLGT}}$ (buffer loading gate). The registers are shifted by CP at memory character frequency. The overall transfer from memory to buffer registers may be termed parallel-by-bit and serial-by-character. $\overline{\text{BLGT}}$ is shown inverted in FIG. 17*m*, and enables transfer during memory rows 1 and 4 for NYSE and AMEX data, and during memory rows 7–13 for TTY data. XFER C4 inhibits transfer at the end of upshift during the time the buffer registers participate in relocating information in the memory.

One buffer register is shown at 121, and comprises an input OR 122, a 50-bit shift register accommodating the first data bits of the 48 characters displayed in a row for NYSE and AMEX, and of the 50 characters displayed for TTY. Recirculation is through line 123 under the control of gate 124. Five similar registers are indicated by box 125 for the second-sixth bits of the characters to be displayed in a given row. Thus, at a given time, the six bits of a character are available simultaneously at output gates 126 and from signals B01–B06. The output gates are inhibited by XFER C4 during EOU transfer.

Figure 15:
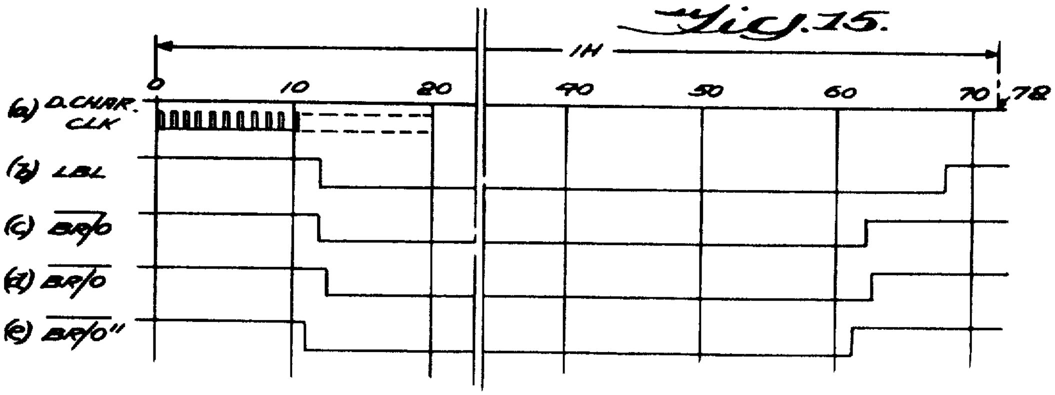

Normally the registers recirculate ten times per character row (twenty times for NYSE and AMEX), so that the output signals can be decoded for each of the ten lines allocated to a display row and the proper dot pattern formed for each display line in succession. Normal recirculation is enabled by B.RECIRC. (FIG. 9) to OR127, which is high during B R/O GT (FIG. 17*n*) for a 50-bit interval determined by BR/0 (FIG. 15*c* inverted). During EOU transfer, the registers recirculate once under the control of XFER C4 (inverted) and $\overline{\text{RTK ADV}}$ (FIG. 16*d*) through gate 128 to OR 127.

Shifting of the registers during recirculation is by CP pulses at display character frequency for normal operation and at memory character frequency at end of upshift transfer. With memory rows 1, 2, 3 interleaved with 8, 9, 10, etc. as explained for FIG. 1, when a given row (say 1) has been loaded into the buffer registers, the next row time (8) is available for buffer recirculation and readout before another memory row (2) is ready for loading. With an odd number of interleaved rows in the memory, alternate loading and readout can proceed in a very convenient manner. If a memory row (e.g. 2) is unused, additional time for recirculation and readout of information of the previous row (1) is available.

At end of upshift, the information for NYSE and AMEX is relocated in the memory two rows after their previous positions. Although a separate delay means could be used for the purpose, here the buffer registers are used. The output lines of the registers are connected to resynchronizing register 129 and thence by gates 131 to EOU transfer register 132. Register 129 is triggered by FF130 which is steered by SYNC 4 and set by $\overline{C}_m$. Transfer is controlled by FF133 steered toward set by SYNC 6 pulses occurring two memory bit intervals before the SYNC 8 pulses of FIG. 14*b*. $\overline{C}_m$ triggers FF133, thereby enabling gate 134 to pass a $\overline{C}_m$ pulse (inverted) to transfer gates 131.

Gate 136 normally passes $C_m$ pulses which trigger register 132 to shift its contents out. The register is steered toward set as indicated. With FF133 set, FF135 is set by the next $C_m$ pulse and its high one-output holds the output of gate 136 low to prevent shifting. When SYNC 6 goes low, FF133 is reset, FF135 is reset, and gate 136 resumes passing shift pulses. Gate 137 is normally closed. However, at the end of upshift, $\overline{\text{XFER C4}}$ opens it during $C_{XFER}$ time (FIG. 18*h*) for memory rows S1 and S4. This supplies EOU XFER data to FF112′ (FIG. 5) for insertion in the memory.

Figure 13:
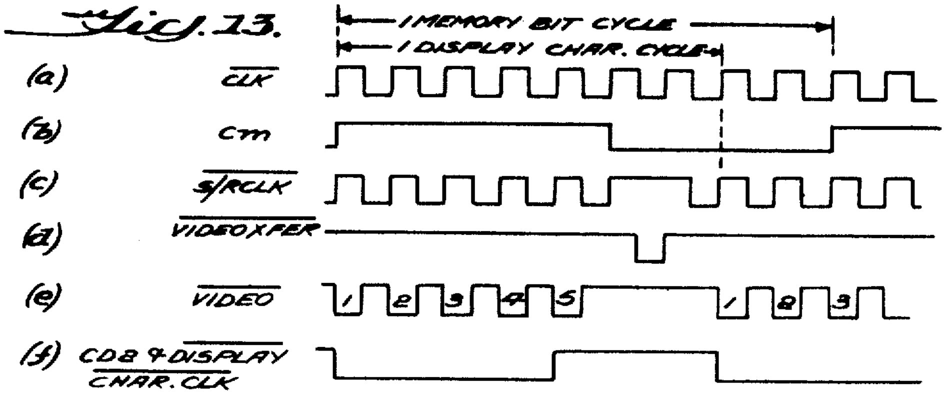

Referring to FIG. 7, most of the basic timing, except for upshift, is shown. A master oscillator 141 provides output pulses designated $\overline{\text{CLK}}$ at display dot frequency and, upon appropriate division, other frequencies used for synchronization. The output is decoded in 142 to form S/R CLK. $\overline{\text{CLK}}$ and $\overline{\text{S/R CLK}}$ are shown in FIG. 13*a* and *c*. The decoder also provides $\overline{\text{VIDEO XFER}}$, shown in FIG. 13*d*. Suitable decoding arrangements will be known to those skilled in the art.

The $\overline{\text{CLK}}$ pulses are divided by 7 in 143 to yield D.CHAR.CLK at display character frequency, which is inverted to form CD2. The latter, and inversion of the former, are shown in FIG. 13*f*. A further division by 72 in counter 144 counts the number of display characters in a display line period. Counter 144 cycles at a rate of 15,600 Hz., the horizontal scanning frequency of the TV display. A maximum of 50 characters per line are displayed in this embodiment, and the states of the stages in 144 are decoded in 145 to form the buffer readout signal $\overline{\text{B.R/0}}$ shown in FIG. 15*c*. This signal is low between counts 12–62, yielding a 50-character readout interval. $\overline{\text{B.R/0'}}$ is similar but occurs one-half bit interval later, and $\overline{\text{B.R/0''}}$ one bit interval earlier, as shown in FIG. 15*d* and *e*. The decoder also provides suitable line blanking signals LBL shown in FIG. 15*b*.

The 9 memory clock counter 146 provides pulses $\overline{C}_m$ at memory bit rate, shown inverted in FIG. 13*b* and 14*a*. These are divided by 8 in memory bit counter 147. The signals FM 1–3 represent the states of the stages in 147, and are decoded in 148 to form the sync signals designated. SYNC 1, 7 and 8 are shown in FIG. 14*b–d*, and the others occupy intervening bit intervals. $\overline{\text{SYNC INH}}$ is shown in FIG. 14*f*.

A further 7 counter 149 provides signals FM4–6 recurring at the 15,600 Hz. horizontal line frequency. $\overline{\text{FM6}}$ is an output of the last stage and is shown inverted in FIG. 14*q*. Decoder 151 uses the FM signals to form FM7 in FIG. 14*r* which is used for horizontal sync pulse generation, and FM8 which occurs midway between FM7 pulses. The two are combined to form the H/2 SYNC SIG of FIG. 14*t*, used for generating equalizing pulses in the vertical sync pattern.

To maintain precise phasing of the display and memory timing circuits, a phase lock signal decoder 152 provides pulses at line frequency to a high speed phase lock control 153 which receives stage outputs from counter 146 and sets counter 143 to a predetermined count at the end of each line period. FM7 pulses are applied to counter 144 for the same purpose.

Figure 16:
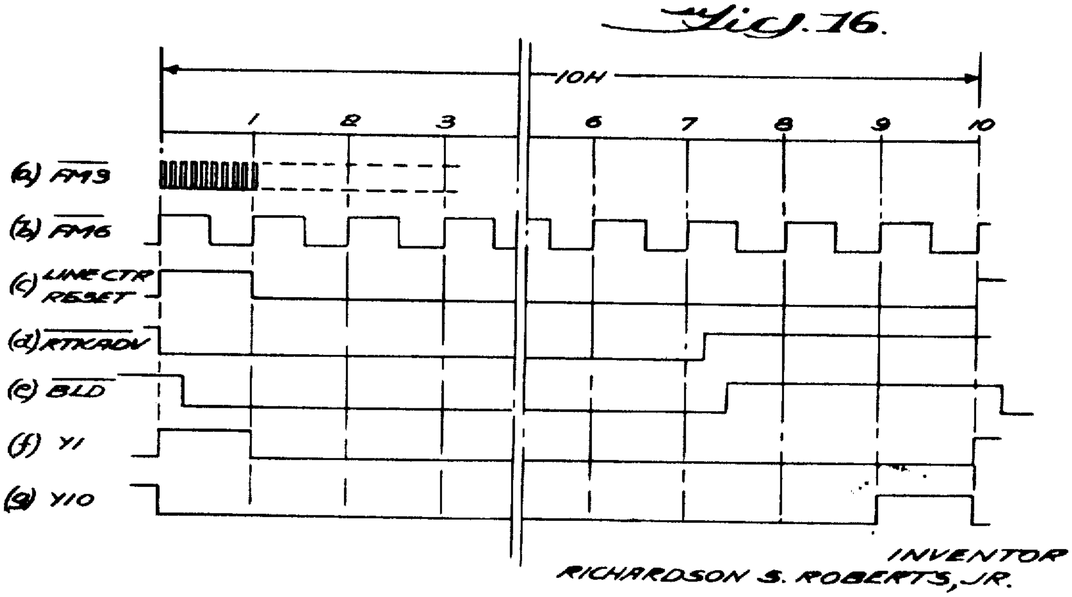

The $\overline{\text{FM6}}$ pulses are applied to a ÷10 fixed line counter 154 which accordingly cycles each 10 lines of the display. The FL outputs of the counter stages provide coded representations of each of the 10 lines in a display row. At each 10 lines a LINE CTR RESET signal is produced as shown in FIG. 16*c*.

Figure 17:
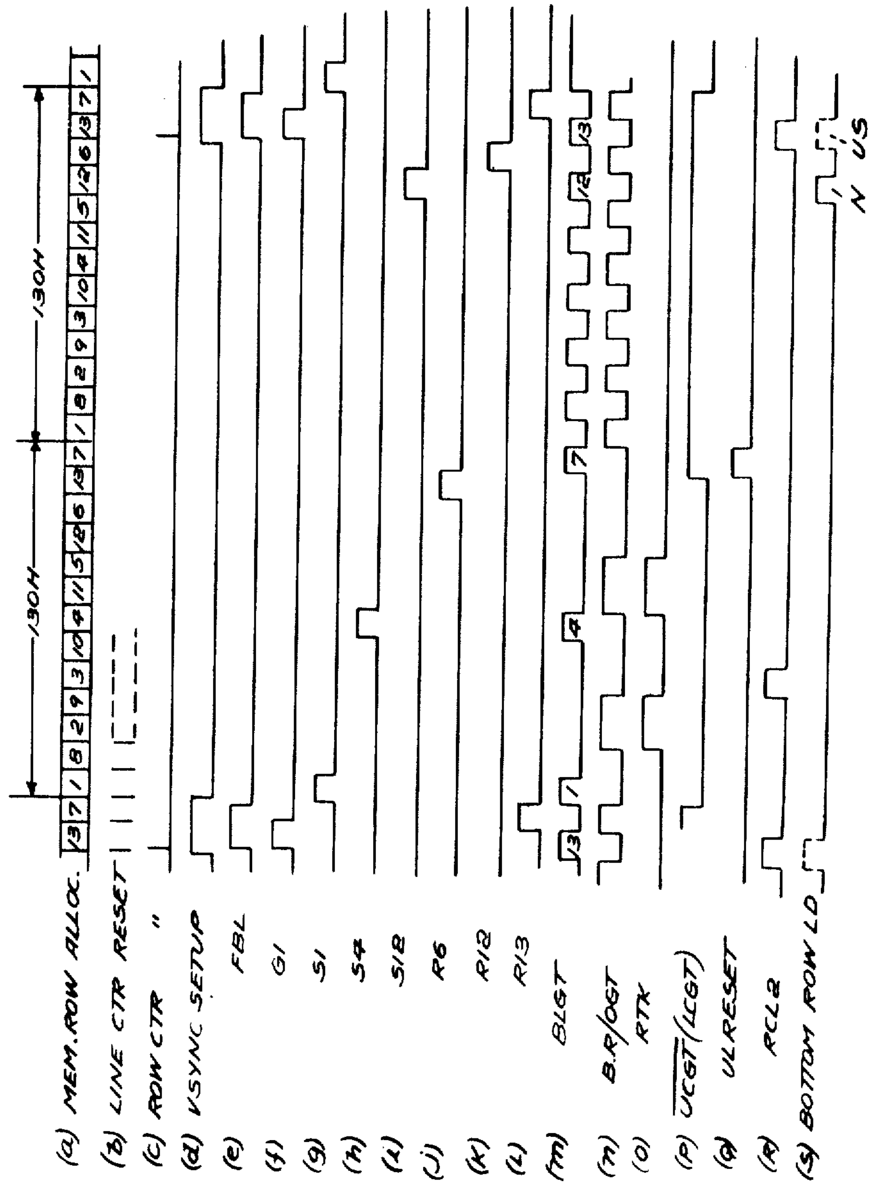

The fixed row counter 155 has a first stage which divides by 2 to yield an FTRO output which cycles each 20 lines of the display. A further ÷13 section cycles at field frequency. Accordingly coded outputs representing all 26 rows in the field period are obtained. These are decoded in 156 to give S and R fixed row gating signals for the rows indicated, and as shown in FIG. 1. Certain of these are shown in FIG. 17. The RCL1 signal used in FIG. 5 is also decoded. The S1 and S4 signals are inhibited by the C20′ signal shown in FIG. 18*g*.

Counter 155 normally cycles by an internal reset to yield the division indicated. At the end of upshift it is reset by EOU RESET for reasons to be described.

The $\overline{\text{FM3}}$ signals are also applied to a ÷70 memory character counter 157. The stage outputs designated FMC are applied to the comparators in the input circuits (FIGS. 3*a*, 4). They are also decoded in 158 to form the buffer load signal $\overline{\text{BLD}}$ and $\overline{\text{RTK ADV}}$. shown in FIG. 16*d*, *e*.

Figure 8:
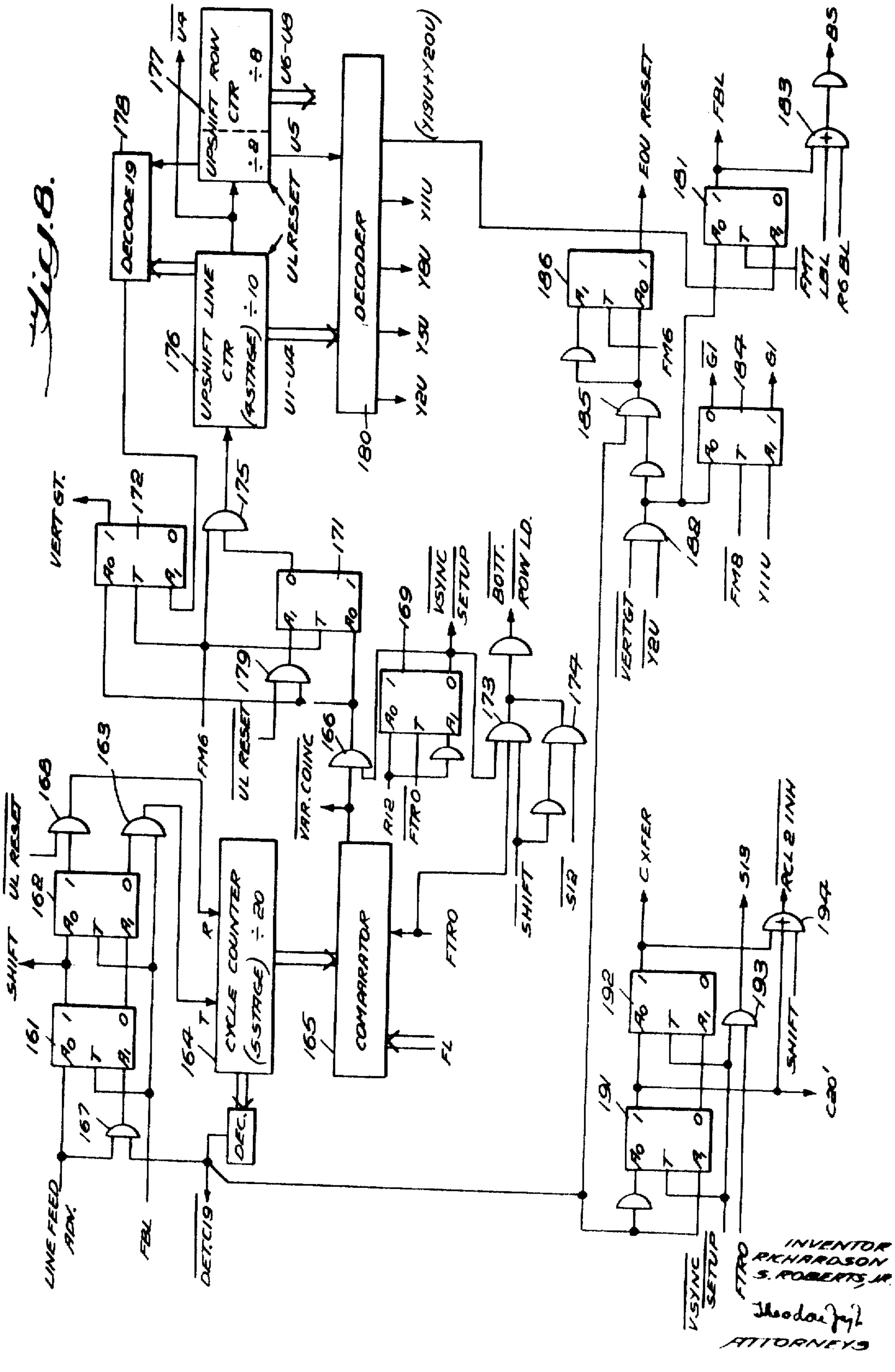

Referring to FIG. 8, timing circuits primarily involved in upshift are shown. The start of a new TTY row may be considered to be written in row R13 of FIG. 1 and then upshifted to R12. The LINE FEED ADV signal from FF70 in FIG. 3 signifies that a new row is to be written, and is fed to FF161 to steer it toward set. The next field blank pulse FBL sets FF161 to make SHIFT high, and steers FF162 to be set by the following FBL pulse. See FIG. 18*a–d*. This enables gate 163 to pass subsequent FBl pulses and advance cycle counter 164 one count per field.

The states of the stages of counter 164 are supplied to comparator 165, along with FL and FTRO signals from the fixed line and row counters 154, 155 (FIG. 7). Coincidence will be found every twenty lines during a field to produce VAR. COINC. During upshift, cycle counter 164 will advance one count each field upon occurrence of an FBL pulse. Consequently coincidence will be found one line later each field during upshift.

A count of 19 in 164 is decoded to form $\overline{\text{DET. C19}}$ (FIG. 18*e* inverted) and is applied to gate 167. At this time LINE FEED ADV. will be low and FF161 reset by the next FBL pulse to make SHIFT low. This FBL pulse will pass through gate 163 to advance the cycle counter to a count of 20 at its trailing edge, this being the reset condition of the cycle counter. FF162 will be reset by the following FBL pulse. This inhibits gate 163 and enables gate 168. $\overline{\text{UL RESET}}$ to gate 168 goes low in the middle of each field (FIG. 17*q* inverted) and applies resets to the cycle counter, except during upshift, to guard against accidental counting.

By this action, $\overline{\text{VAR. COINC}}$ will shift one line per field for 20 fields and arrive at its normal position.

$\overline{\text{VAR. COINC}}$. eventually determines the timing of the vertical sync signal. During normal operation cycle counter 164 remains reset and comparator 165 compares the fixed line and row counts with this reset condition. Accordingly $\overline{\text{VAR. COINC}}$ is developed at the same fixed count and serves to time vertical synchronization during normal as well as upshift cycles.

$\overline{\text{VAR. COINC}}$. is applied to gate 166. Since the development of the vertical sync signal should take place only at the bottom of the display, FF169 is steered by R12 which occurs during the display of row R12 (FIGS. 1 and 17*k*) and set by $\overline{\text{FTRO}}$ from the first stage of fixed row counter 155 (FIG. 7) which occurs every 20 lines. This produces a low $\overline{\text{V SYNC SETUP}}$ (FIG. 17*d*) which enables gate 166 at the bottom of the display field. When $\overline{\text{VAR. COINC}}$ occurs during this interval, it steers FF171 and FF172 toward set. The next FM6 pulse from counter 149 (FIG. 7) sets both flip-flops. FF172 yields a high VERT GT. signal which participates in developing the vertical sync pattern, as will be described.

The low $\overline{\text{V SYNC SETUP}}$ and low $\overline{\text{SHIFT}}$ enable gate 173, and when FTRO goes low the inverted output forms $\overline{\text{BOTT. ROW LD}}$ (FIG. 17*s* inverted) which goes low at S13 time during upshift. This enables gate 77 (FIG. 3*a*) so that channel 3 writing can proceed in S13 of the memory. After upshift is completed, $\overline{\text{SHIFT}}$ is high and is inverted to a low at gate 174. This, together with a low $\overline{\text{S12}}$, makes $\overline{\text{BOTT. ROW LD}}$. low during S12. Consequently, after upshift, characters are entered in S12 of the memory and displayed in R12.

The setting of FF171 enables gate 175 to pass FM6 pulses to a 10 upshift line counter 176 whose last stage output is $\overline{\text{U4}}$. The latter is applied to an upshift row counter 177 having cascaded 2 and 8 stages yielding a possible 16. Both counters are reset each field by UL RESET (FIG. 17*g*) at the middle of the display.

Counter 176 and the first stage of 177 count 20 lines at the bottom of the display. Accordingly a count of 19 is decoded in 178 and steers FF172 to be reset by the next FM6 pulse, terminating VERT GT. However, FF171 remains set until $\overline{\text{UL RESET}}$ to gate 179 resets it at the middle of the next field, so that the upshift counters 176, 177 continue to count during the upper half of the display.

The U1–U5 outputs, representing coded combinations of 20 lines, are applied to decoder 180 to yield the signals indicated. Signal (Y19U +Y20U) is high for lines 19 and 20. Prior to this, it is low at the $A_1$input of FF181. With $\overline{\text{VERT GT}}$ low to gate 182, when $\overline{\text{Y2U}}$ goes low the high gate output steers FF181 toward set and $\overline{\text{FM7}}$ sets it to give a high field blanking signal FBL (FIG. 17*e*). When (Y19U +Y20U) goes high, $\overline{\text{Y2U}}$ will be high and FF181 will be reset. As will be understood, the FBL signal moves with the $\overline{\text{VAR. COINC}}$ pulse. The signals for field blanking, line blanking and row 6 blanking (FIG. 10) are combined by OR183 and inverted to form the complete blanking signal BS.

The output of gate 182 is also fed to FF184 along with Y11U. This is triggered by $\overline{\text{FM8}}$ to form G1 and $\overline{\text{G1}}$, representing the envelope of the vertical sync pattern (FIG. 17*f*).

Figure 18:
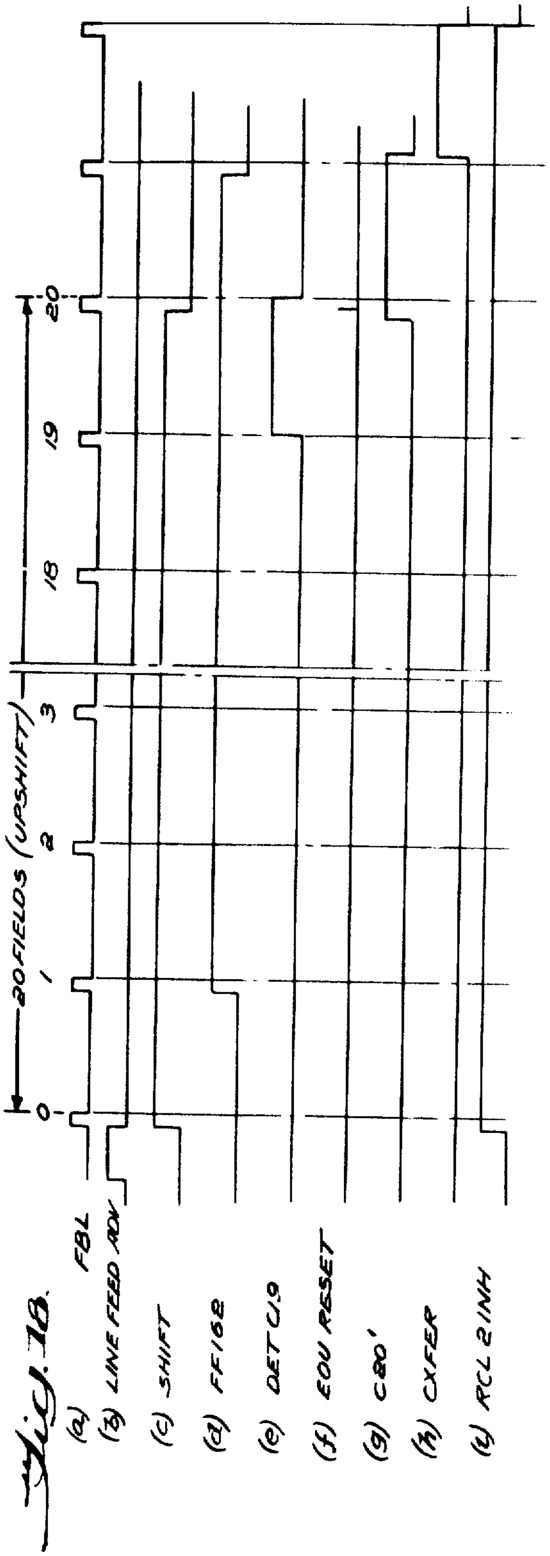

The inverted output of gate 182 is supplied to gate 185 along with $\overline{\text{DET C19}}$. This steers FF186 toward set and FM6 triggers FF186 to produce a short EOU RESET pulse (FIG. 18*f*). This resets the fixed row counter 155 in Fig. 7. FF186 is steered toward set at the same time FF181 is steered toward set, when $\overline{\text{DET C19}}$ is low. However, FF181 is triggered by $\overline{\text{FM7}}$ (FIG. 14*r* inverted) slightly before FF186 is triggered by FM6 (FIG. 14*q*. Thus FBL is produced for the 19th line upshifting just before EOU RESET resets the fixed row counter, and the trailing edge of the FBL pulse advances the cycle counter 164 to a count of 20, which is its reset condition. The next $\overline{\text{VAR. COINC}}$ pulse will then occur in its normal position.

Prior to reset, the fixed row counter will be at a count of 2, corresponding to the two rows counted during upshift. Consequently the reset will move the row decoding back by an amount equal to the total delay of vertical sync produced during upshift. In effect, the information in the memory rows will now occur at the memory output two rows earlier with respect to the vertical sync pulse, which is appropriate for the bottom half of the display since the information in a given memory row is now displayed in the row above its previous position. However, the information in the top half of the display would also be moved up. This is taken care of by the relocation of the upper half information during the transfer cycle as mentioned above, and as will be further described hereinafter in connection with FIG. 12.

When upshift is completed, relocation of NYSE and AMEX data in the memory takes place under the control of $C_{XFER}$(FIG. 18*h*). FF191 is steered toward set when $\overline{\text{DET C19}}$ goes low, and is set by the trailing edge of $\overline{\text{Vsync SETUP}}$ to produce a high C20′ signal (FIG. 18*g*). FF192 is set by the next $\overline{\text{Vsync SETUP}}$ to produce a high $C_{XFER}$and FF191 is reset. Gate 193 produces S13 at this time. $C_{XFER}$, C20′ and SHIFT to OR194 produces $\overline{\text{RCL2 INH}}$ (FIG. 18*i* inverted). The inverse of this signal is used in FIG. 3 to prevent a further LINE FEED ADV during upshift.

Figure 9:
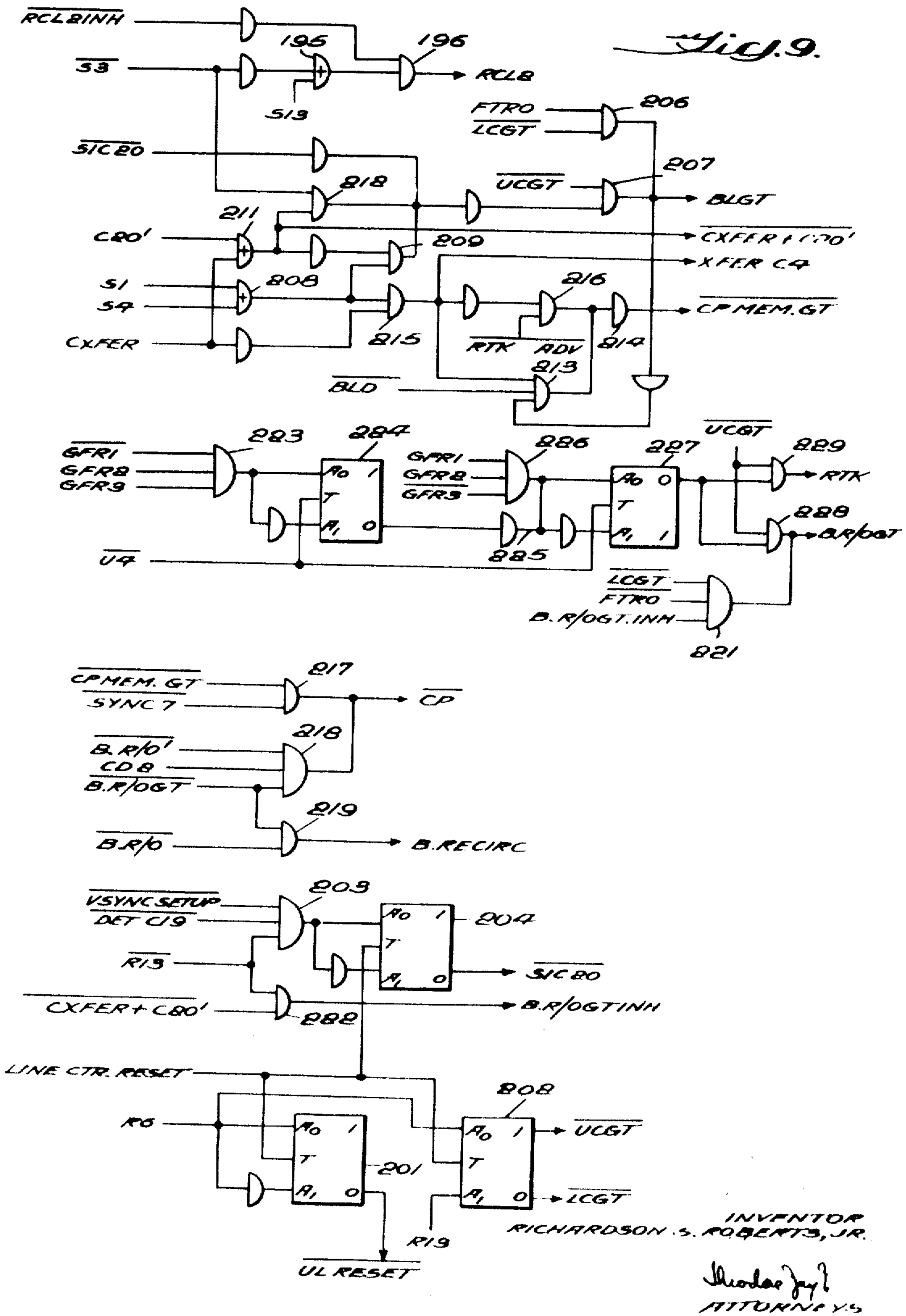
FIGS. 9 and 10 show the manner of generating signals used in other FIGURES.

Referring to FIG. 9, $\overline{\text{S3}}$ inverted and S13 are combined by OR195 and applied to gate 196 to yield RCL2 (FIG. 17*r*) which normally clears rows S3 and S13 in the memory (FIG. 5). During upshift and transfer in the memory at the end of upshift, RCL2 is inhibited by $\overline{\text{RCL2 INH}}$ inverted and applied to gate 196.

At the bottom of FIG. 9, FF201 is steered by R6 and triggered by LINE CTR RESET to form $\overline{\text{UL RESET}}$ (FIG. 17*q* inverted) for gate 179 in FIG. 8. FF202 is set by the same signals since R13 is then low, and steered toward reset when R13 goes high. LINE CTR RESET triggers FF202, forming $\overline{\text{UCGT}}$ (FIG. 17*p*) and its inversion designated $\overline{\text{LCGT}}$.

The formation of the buffer loading gate BLGT is shown near the top of FIG. 9, and the normal waveform in FIG. 17*m*. The loading sections for rows 7–13 are produced by gate 206. FTRO is low for alternate 10-line counts and $\overline{\text{LCGT}}$ is low for the lower portion of the display. Gate 207 is enabled by $\overline{\text{UCGT}}$ during the upper portion of the display. Normally S1 and S4, combined by OR208, pass through gate 209 and are inverted and pass gate 207 to form the loading sections 1. and 4. During transfer after upshift, this normal path is inhibited. Thus, $C_{XFER}$and C20′ shown in FIG. 18*h* and *g* are combined by OR211 to form $\overline{C_{XFER}\text{+C20}'}$, and the result inverted and used to inhibit gate 209.

Buffer loading at the end of upshift, when fixed row counter 155 (FIG. 7) is reset by EOU RESET, requires special loading signals for NYSE and AMEX until normal operation is resumed. Prior to reset this information is in rows S1 and S4 of the memory. After reset these rows become S13 and S3, as defined by counter 155. But the actual location of the information in the memory remains unchanged for the moment, since it is traveling down the memory delay line. The data must be read out of the memory as it reaches the memory output, and loaded into the buffers, in order to be displayed. Loading of AMEX data is obtained by $\overline{\text{S3}}$ to gate 212, the gate being enabled by $\overline{C_{XFER}\text{+20}'}$, and the gate output inverted to gate 207.

NYSE data is close to the memory output at the time of EOU RESET. A special signal S1C20 is developed for one field to enable its loading into the buffer at this time. Near the bottom of FIG. 9, gate 203 is supplied with $\overline{\text{Vsync SETUP}}$, $\overline{\text{DET C19}}$ and $\overline{\text{R13}}$ to steer it toward set, and it is set by LINE CTR. RESET to make $\overline{\text{S1C20}}$ low at the time the NYSE data reaches the memory output. The signal is double inverted to gate 207 to form part of BLGT. For the following field, S13 in the BLGT signal from gate 206 loads NYSE data.

The loading of NYSE and AMEX from redefined S13 and S3 continues during $C_{XFER}$ time while the data is being transferred back to the memory input and inserted in S1 and S4. After the transfer has taken place, $C_{XFER}$ goes low and gate 212 is inhibited. Thereafter normal loading from S1 and S4 resumes, and RCL2 clears S13 and S3.

The signal $\overline{CP\ MEM.GT}$ is normally an enabling signal during each row of the buffer loading gate BLGT for the 50 characters defined by the buffer load signal $\overline{BLD}$ (FIG. 16e). This is obtained by supplying the inverted BLGT to gate 213 along with $\overline{BLD}$, and inverting the gate output in 214. During EOU transfer, this channel is inhibited and the 50 character interval defined by $\overline{RTK\ ADV}$ (FIG. 16d) during S1 and S4 is developed. To accomplish this, the output of OR208 is supplied to gate 215 along with inverted $C_{XFER}$, yielding XFER C4 which is high for memory rows S1 and S4 during $C_{XFER}$. This is used in FIG. 6 as already described. XFER C4 inhibits gate 213, and is inverted and applied to gate 216 along with $\overline{RTK\ ADV}$. The result is supplied to inverter 214.

$\overline{CP\ MEM.GT}$ is applied to gate 217 along with $\overline{SYNC\ 7}$ pulses to form $\overline{CP}$ shift pulses at memory character frequency during buffer loading and EOU transfer. Gate 218 changes the $\overline{CP}$ pulses to display character frequency during buffer readout by using CD2 pulses (FIG. 13f) during each row of the buffer readout gate $\overline{B.R/O\ GT}$ (FIG. 17n) for the 50 characters per row defined by $\overline{B.R/O'}$ (FIG. 15d).

$\overline{B.R/O\ GT}$ and $\overline{B.R/O}$ to gate 219 produce B.REC1RC used in FIG. 6 to gate the buffer register during normal recirculation.

The part of B.R/O GT for the lower portion of the display is produced by gate 221. $\overline{LCGT}$ enables the gate during the lower portion and $\overline{FTRO}$ is low for alternate rows of the display. B.R/OGT INH. inhibits the gate at R13 time during C20' and $C_{XFER}$. The latter signal is developed by gate 222.

Figure 10:
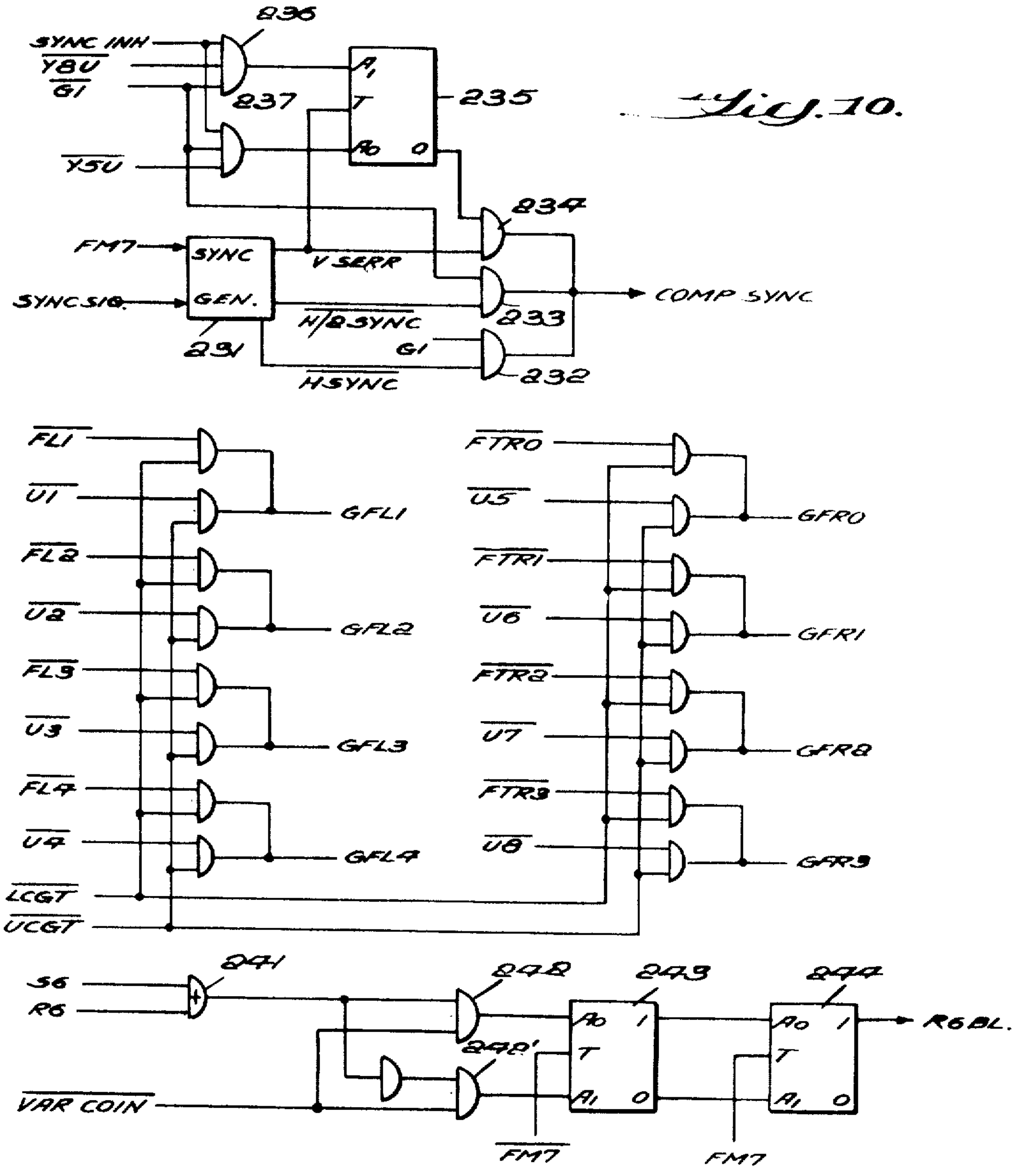

The part of B.R/0 GT for the upper portion of the display is developed by decoding gated row signals GFR developed in FIG. 10. These are fixed row signals in normal operation, and upshift row signals during upshift. Gate 223 decodes the proper rows for NYSE readout and FF224 is set by $\overline{U4}$ ( which goes high each ten lines) to make line 225 high. Gate 226 decodes the proper rows for AMEX and gives a high output. For each row, FF227 is set by $\overline{U4}$ and its O-output goes low. $\overline{UCGT}$ enables gate 228 during the upper portion of the display and the FF output forms part of B.R/O GT. Gate 229 is also enabled and its output yields RTK (FIG. 17o).

Referring to FIG. 10, the development of the composite sync signal is shown. FM7 to sync generator 231 occurs at horizontal sync time and is used to develop $\overline{H\ SYNC}$ signals to gate 232. G1 (FIG. 17f) inhibits the gate during the vertical sync pattern. H/2 SYNC SIG. is at double frequency and is used to develop the usual equalizing pulses preceding and following the vertical sync pulse, and supply them to gate 233. The gate is enabled by $\overline{G1}$ during the vertical sync pattern. The sync generator also supplies double line frequency pulses to gate 234 to produce the usual serrations in the vertical sync pulse. The vertical sync pulse itself is produced by FF235. Input gates 236 and 237 are inhibited by SYNC INH to prevent triggering the FF during the first portion of a line. $\overline{G1}$ to both gates goes low during the vertical sync interval. At Y50 time (decoded line 5 of the upshift line counter of FIG. 8), FF235 is set by a pulse from sync generator 231 and its O-output to gate 234 goes low, giving a high gate output except during the vertical serrations. At $\overline{YSU}$ time FF235 is reset. The outputs of gates 232–234 are combined to form the composite sync signal. As previously stated, this is the conventional sync signal except that it is the same for each field since interlacing is not employed.

In order to provide for upshifting of the lower portion of the display without upshifting the upper portion, gated line signals are developed by applying $\overline{FL1\text{–}FL4}$ signals from the four stages of fixed line counter 154 in FIG. 7 to respective gates which are enabled by $\overline{LCGT}$ during the lower portion of the display. $\overline{U1\text{–}U4}$ signals from the upshift line counter 176 of FIG. 8 are applied to respective gates enabled by $\overline{UCGT}$ during the upper portion of the display. Gates of like order are connected together and form gated line signals GFL1–GFL4. Similarly, $\overline{FTRO\text{–}FTR3}$ signals from the fixed row counter 155 and the $\overline{U5\text{–}U8}$ signals from the upshift row counter 177 are gated and combined to form gated row signals GFRO–GFR3. These are the signals used in FIG. 9 to develop the portion of B.R/O GT for the upper portion of the display.

During upshift the time occurrence of the GFL and GFR signals for the lower portion of the display will change with respect to the vertical sync signal by one line per field since, as explained for FIG. 8, the variable coincidence signal $\overline{VAR\ COINC}$ which ultimately establishes the timing of the vertical sync signal varies with respect to the fixed line and row counters. This yields the desired upshift. However, the time occurrence of the GFL and GFR signals for the upper portion of the display will not change with respect to the vertical sync signal since both are determined by the upshift counters. Hence the upper portion of the display will not upshift.

Figure 19:
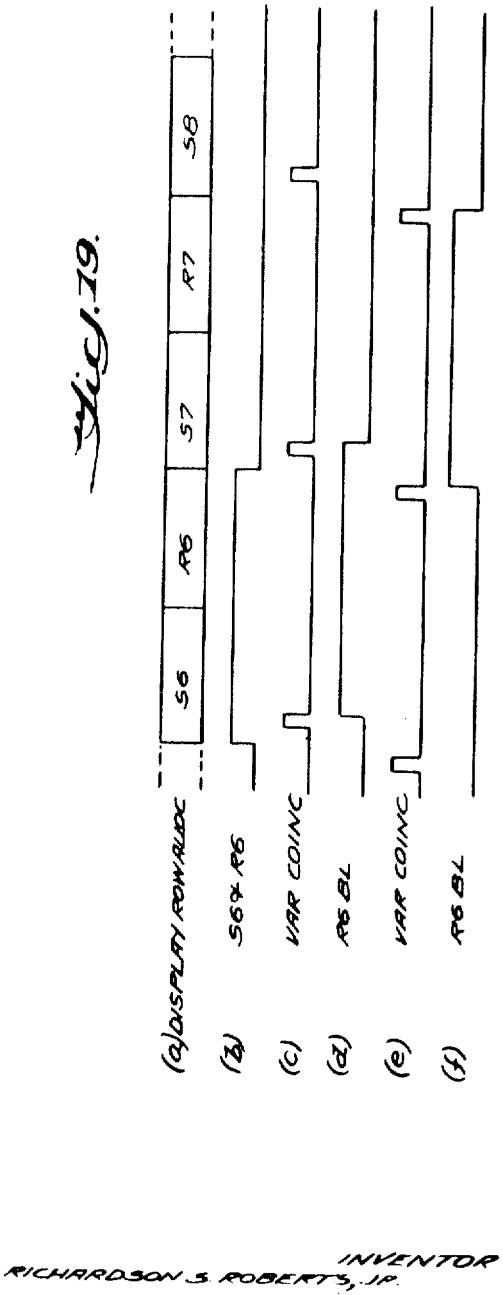

During upshift the top row of the lower portion of the display is blanked out line by line as the new bottom row appears. A row 6 blanking signal R6BL is developed for the purpose. At the bottom of FIG. 10, signals $\overline{S6\ and\ R6}$ from the fixed row decoder of FIG. 7 are supplied to OR241 and yield an output S6+R6, the inverse of which is shown in FIG. 19b. It is a signal of 20 lines duration just before the $\overline{UCGT}$ signal changes, and is applied to gate 242 and inverted to gate 242'. When $\overline{VAR.\ COINC}$ occurs gate 242 is enabled and FF243 set by $\overline{FM7}$. FF244 is then set by FM7 at horizontal sync time, making R6BL high FIG. 19 illustrates the operation. S6 +R6 extends over display row allocations S6 and R6. R6BL moves with VAR. COINC so that it can blank a 20-line interval after VAR. COINC occurs.

Figure 11:
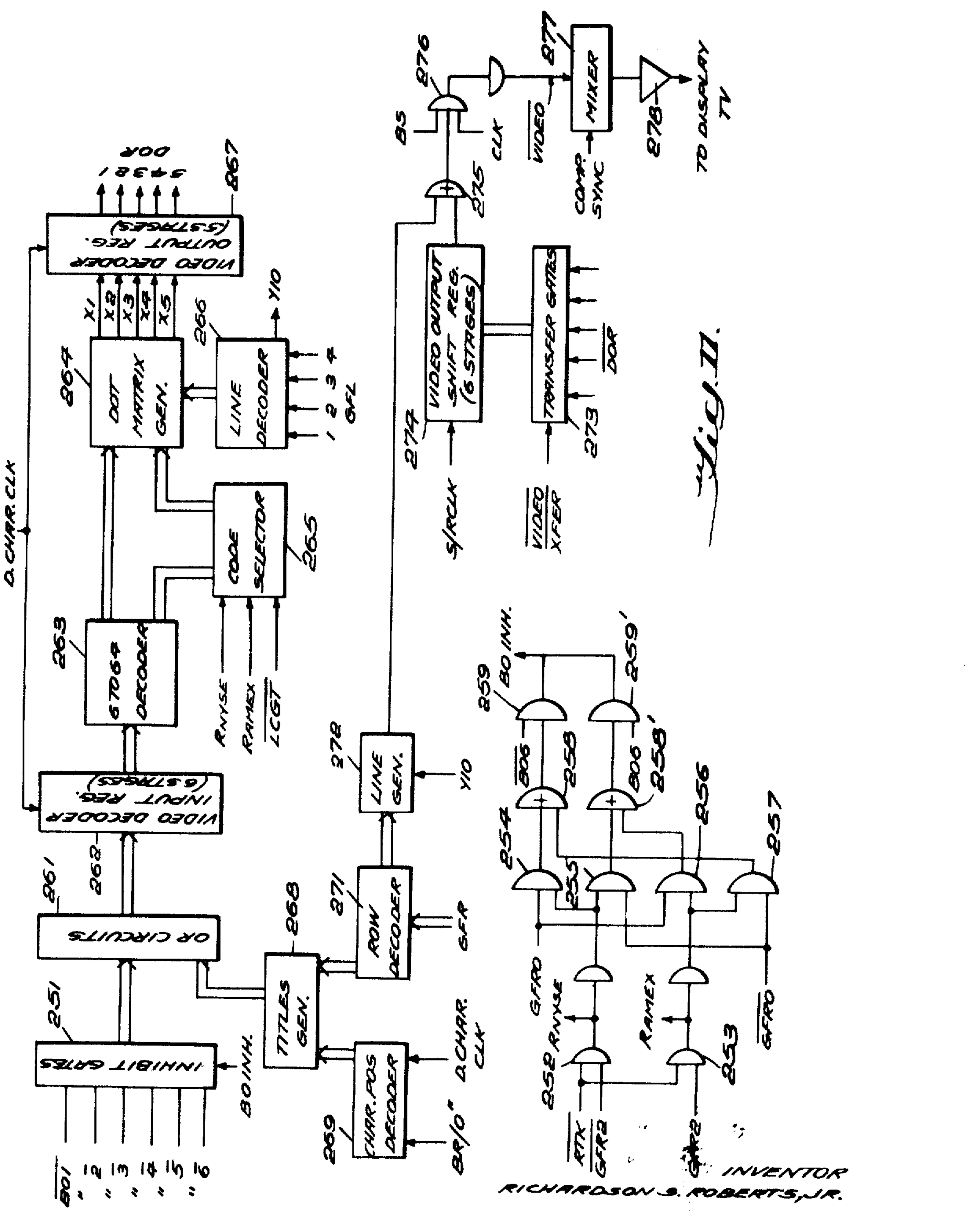
FIG. 11 shows the character encoder and video output arrangement.

Referring to FIG. 11, the decoding of buffer characters and formation of the video signal is shown. The buffer output signals BO1–B06 (FIG. 6) are inverted and supplied in parallel to inhibit gates 251. For NYSE and AMEX, figures are decoded and displayed one row below letters. Accordingly the transfer of figure characters is delayed one row by the buffer output inhibit signal BOINH.

The signal is developed by applying $\overline{RTK}$ (FIG. 17o inverted) to gates 252, 253 to enable them only during NYSE and AMEX read-out times. Suitable gated row GFR signals are selected from FIG. 10 to separate the two. In the counters here employed, $\overline{GFR2}$ is low when NYSE data is displayed, yielding $R_{NYSE}$. GFR2 is low when AMEX data is displayed, yielding $R_{AMEX}$. These signals are inverted and applied to gates 254–257 along with GFRO and $\overline{GFRO}$ signals as shown. GFRO is normally low during S2 and S5; $\overline{GFRO}$ is normally low during R2 and R4. During upshift these signals vary with VAR. COINC (FIG. 8), as does the buffer readout gate. Consequently the output of OR258 will be low during the first display rows of NYSE and AMEX. The output of OR258' will be low for the second display rows.

The $\overline{BO6}$ signal to gate 259 is low for figures, thereby making BO INH high during the first display rows to inhibit transfer gates 251. Gate 259' will make BO INH high during the second rows for letters.

The buffer characters pass from gates 251 in parallel through OR circuits 261 to the video decoder input register 262. At display character clock time from counter 143 in FIG. 7, the bits of a character are supplied in parallel to a 6-to-64 decoder 263 which converts the possible 64 combinations of 6 bits to corresponding individual outputs. Some characters have like codes in NYSE, AMEX and TTY codes, and the corresponding individual outputs are supplied directly to dot matrix generator 264. Others are coded differently and the individual outputs are supplied to code selector 265. This contains gates responsive to $R_{NYSE}$, $R_{AMEX}$ and $\overline{LCGT}$ to provide individual outputs to generator 264 which are the same for the same characters in any of the codes.

Line decoder 266 receives gated line signals GFL1–GFL4 from FIG. 10 and decodes them to yield Y1–Y10 line signals (FIGS. 1a, and 16f, g) to generator 264. It will be understood that these Y signals vary with VAR. COINC for the upper half of the display during upshift, as do the buffer recirculating, buffer readout and field sync signals, so that the decoded lines do not upshift on the display.

It will be remembered that a given row recirculates ten times in the buffer registers of FIG. 6 for TTY and twenty times for NYSE and AMEX. At Y1 time generator 264 provides outputs in the proper bit pattern to lines X1–X5 for the dots in line Y1 of all characters of that row, character by character. At Y2 time the matrix provides the proper X1–X5 outputs for the dots in line Y2 of all characters of that row, character by character, and similarly for lines Y3–Y10. The process repeats for the second row of NYSE and AMEX.

The X1–X5 outputs are supplied in parallel to a 5-stage video decoder output register 267 which is triggered by D.CHAR.CLK to supply corresponding DOR1–DOR5 outputs.

As mentioned previously, the fixed titles (FIG. 1) are inserted by a separate generator, shown at 268. The generator has selectable circuits for generating the necessary characters and supplies coded outputs to OR circuits 261. Character position and row decoders 269, 271 give the necessary information for character selection and timing. Decoder 269 is supplied with B.R/O'' (FIG. 15*e*) to select a 50 character interval and with the D.CHAR.CLK signal from counter 143 in FIG. 7. Decoder 271 is with GFR signals from FIG. 10 to decode the proper rows.

Line generator 272 is actuated by signals from decoder 271 and Y10 from decoder 266 to generate lines 20 (FIG. 1) at the proper times.

The DOR signals from register 267 are supplied in parallel to transfer gates 273. At VIDEO XFER time (FIG. 13*d*) the signals are transferred in parallel to respective stages of video output shift register 274. This is shifted by S/R CLK (FIG. 13*c* inverted) to OR275. Fixed line signals from 272 are also supplied to OR275, and the output supplied to gate 276. Clock signals CLK (FIG. 13*a* inverted) to gate 276 alternately open and close the gate at display bit frequency to form a dot pattern. Blanking signal BS from FIG. 8 inserts the desired blanking. The output of gate 276 is inverted to form the video signal VIDEO shown in FIG. 13*e* for a character containing dots in all five positions of the particular line shown, followed by a space equal to two dot intervals.

VIDEO is supplied to mixer 277 along with COMP SYNC from FIG. 10 to form the complete television signal which is fed through an output amplifier 278 to the display TV unit or units.

Figure 12:
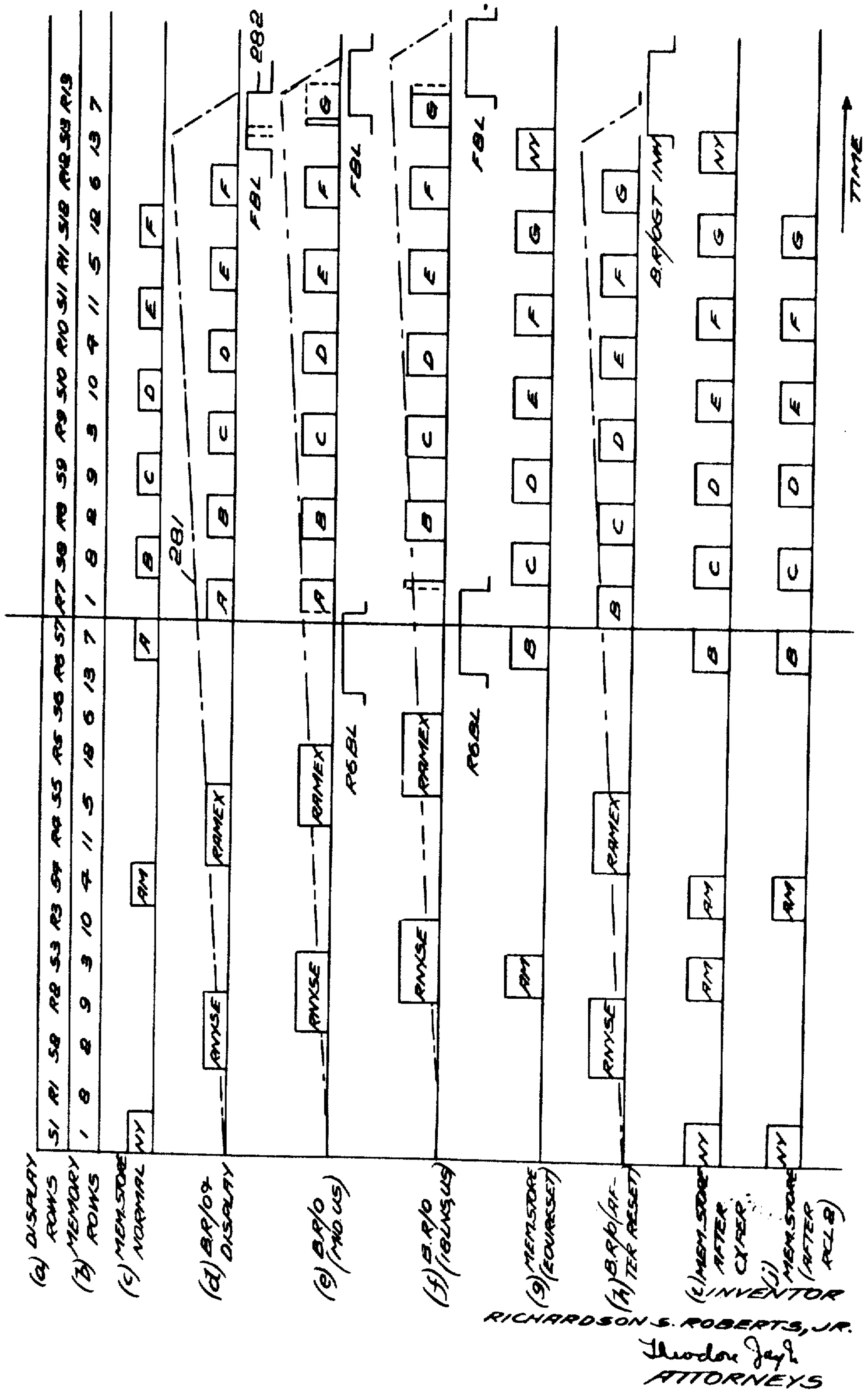
FIG. 12 is explanatory of signal storage and readout during normal and upshift cycles.

Referring to FIG. 12, the display and memory rows are shown corresponding to FIG. 1. Normally NYSE and AMEX data are stored in memory rows S1 and S4 as shown at *c*, corresponding to BLGT in FIG. 17*m*. It is assumed that TTY information has been stored in memory rows S7–S12. Normal buffer read-out and display is shown at *d*, resulting from the signal shown in FIG. 17*n*. Letters A–F correspond to the initial letters of the rows shown in FIG. 1. The vertical sawtooth sweep is indicated at 281 for convenient reference. Normal vertical field blanking is indicated at 282 with the vertical sync pulse shown dotted within the blanking interval.

Row *e* shows the situation at the middle of an upshift cycle. New TTY information has been stored in memory section S13 and begins to appear at G. The vertical sweep and vertical blanking has shifted to the right, so that rows A–F have moved upward on the display. The R6BL signal indicated at 283 begins to blank the upper portion of A. The read-out intervals for NYSE and AMEX have shifted to the right along with the e sweep, so their position on the display is unchanged.

Row *f* shows the situation near the end of upshift. The vertical sweep has moved farther to the right, most of row G is now visible and most of row A has disappeared.

Row *g* shows the storage positions in the memory just after EOU RESET of the fixed row counter 155 (FIG. 7). Information B–G is now located in rows S7–S12 of the memory, as redefined by counter 155. Information A was temporarily in redefined S6 and has been cleared by RCL1 (FIG. 5). NY data is now in S13 and AM data in S3, as redefined.

Row *h* shows the restoration of normal readout, with the vertical sweeps positioned as in *d*. However, TTY data B–G occupies the display rows formerly occupied by A–F. B.R/O GT INH prevents readout of NY data during R13.

Row *i* shows the memory store immediately after transfer. NY data has been stored in S1 and AM data in S4, but also remain in S13 and S3, respectively. S13 and S3 are then cleared in the memory RCL2 (FIG. 5) and the memory storage is back to normal, as shown at *j*.

The invention has been described in connection with a specific embodiment thereof in which part of the display is upshifted and the other part remains nonupshifted. If desired the entire display may be upshifted.

Also, specific circuits and arrangements have been described to perform the operations described. It will be understood that modification may be made by those skilled in the art if desired, and that some features of the invention may be employed while omitting others, as meets the requirements of a particular application.

I claim:

1. Apparatus for receiving, storing, releasing and recirculating information in the form of coded electrical signals, each signal having a designated number of bits and representing a predetermined character, said apparatus comprising:

an input section having a first input to which new information is supplied in serial bit form;

first means coupled to said input section to combine said new information into a single train of signals in which the serial bit formed is retained;

a first information storage unit responsive to said train of signals to recirculate said train therein at a first selected rate;

second means responsive to the recirculated train of signals to convert same into bit-parallel, serial-character form whereby a plurality of synchronized signal trains equal to the number of bits per character is formed; and a second information storage unit responsive to said synchronized signal trains to recirculate therein all of same at a second selected rate synchronous with said first selected rate and without impairing relative time relationships among these synchronized trains; said second unit having an output at which said plurality of trains can be released from said second unit.

2. Apparatus as set forth in claim 1 including third means to selectively eliminate selected characters recirculating in said first unit.

3. Apparatus as set forth in claim 2 wherein said input section is provided with a second input to which recirculated information is supplied in serial bit form, and wherein said first means combines said new information with said recirculating information into said signal train.

4. Apparatus as set forth in claim 3 further including fourth means coupled to said output to reassemble said synchronized signal trains into a single train in serial bit form.

5. Apparatus as set forth in claim 4 further including fifth means coupled between said fourth means and said second input to feedback said single train in serial bit form with controllable time delay to said second input.

* * * * *